US009443319B2

(12) United States Patent
Saito et al.

(10) Patent No.: US 9,443,319 B2
(45) Date of Patent: *Sep. 13, 2016

(54) IMAGE PROCESSOR FOR MOTION SEARCHES

(71) Applicant: MegaChips Corporation, Osaka-shi (JP)

(72) Inventors: Kazuhiro Saito, Osaka (JP); Yujiro Tani, Osaka (JP); Shinichi Murata, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/367,632

(22) PCT Filed: Nov. 30, 2012

(86) PCT No.: PCT/JP2012/081111
§ 371 (c)(1),
(2) Date: Jun. 20, 2014

(87) PCT Pub. No.: WO2013/094388
PCT Pub. Date: Jun. 27, 2013

(65) Prior Publication Data
US 2014/0369562 A1 Dec. 18, 2014

(30) Foreign Application Priority Data

Dec. 22, 2011 (JP) ................................ 2011-281870

(51) Int. Cl.
*G06K 9/00* (2006.01)
*G06T 7/20* (2006.01)
*H04N 19/433* (2014.01)

(52) U.S. Cl.
CPC ............... *G06T 7/20* (2013.01); *H04N 19/433* (2014.11)

(58) Field of Classification Search
None
See application file for complete search history.

(56) References Cited

U.S. PATENT DOCUMENTS

2005/0073455 A1* 4/2005 Chow ................. G01S 13/9017
342/25 F
2008/0049035 A1* 2/2008 Kuroda ..................... G06T 1/60
345/536

(Continued)

FOREIGN PATENT DOCUMENTS

JP 2004-248024 A 9/2004
JP 2007-6381 A 1/2007

(Continued)

OTHER PUBLICATIONS

Translated abstract for cited reference of (1) JP 2008-22134 A dated Jan. 31, 2008, from IDS submitted on Nov. 5, 2015. Obtained via PAJ on Apr. 29, 2016, https://www.j-platpat.inpit.go.jp/web/all/top/BTmTopEnglishPage.*

(Continued)

*Primary Examiner* — Tahmina Ansari
(74) *Attorney, Agent, or Firm* — Oblon, McClelland, Maier & Neustadt, L.L.P.

(57) ABSTRACT

An image processor includes an LSRAM accessible with a higher speed than a frame memory and configured to hold a second image in a predetermined range of a first image, an image production unit configured to read an image in a predetermined range of the second image and produce a third image for rough search based on the read image, an MSRAM accessible with a higher speed than the frame memory and configured to hold the third image, a first search unit configured to read the third image and perform first motion search based on the third image, and a second search unit configured to read a fourth image in a predetermined range of the second image based on a search result by the first search unit and perform second motion search that is more detailed than the first motion search based on the fourth image.

26 Claims, 22 Drawing Sheets

(56) References Cited

U.S. PATENT DOCUMENTS

| | | | |
|---|---|---|---|
| 2008/0130751 A1 | 6/2008 | Kobayakawa et al. | |
| 2010/0208084 A1* | 8/2010 | Pinto | H04N 5/145 348/207.1 |
| 2012/0177253 A1* | 7/2012 | Tseng | G06T 3/4038 382/107 |
| 2014/0334688 A1* | 11/2014 | Saito | H04N 19/436 382/107 |
| 2014/0369562 A1* | 12/2014 | Saito | H04N 19/433 382/103 |

FOREIGN PATENT DOCUMENTS

| | | |
|---|---|---|
| JP | 2007-96696 | 4/2007 |
| JP | 2008-22134 A | 1/2008 |
| JP | 2008-141288 | 6/2008 |
| JP | 2009-284208 | 12/2009 |

OTHER PUBLICATIONS

Translated abstract for cited reference of (2) JP 2007-6381 A dated Jan. 11, 2007, from IDS submitted on Nov. 5, 2015. Obtained via PAJ on Apr. 29, 2016, https://www.j-platpat.inpit.go.jp/web/all/top/BTmTopEnglishPage.*

Translated abstract for cited reference of (3) JP 2004-248024 A dated 09102/2004 from IDS submitted on Nov. 5, 2015. Obtained via PAJ on Apr. 29, 2016, https://www.j-platpat.inpit.go.jp/web/all/top/BTmTopEnglishPage.*

International Search Report issued Feb. 26, 2013, in PCT/JP12/081111 filed Nov. 30, 2012.

U.S. Appl. No. 14/367,632, filed Jun. 20, 2014, Saito et al.

U.S. Appl. No. 14/367,500, filed Jun. 20, 2014, Saito et al.

Office Action issued Aug. 5, 2015 in Japanese Patent Application No. 2011-281870 (with English language translation).

* cited by examiner

FIG. 6A
| Y00 | Y01 | Y02 | Y03 | Y04 | Y05 | Y06 | Y07 | Y08 | Y09 | Y0a | Y0b | Y0c | Y0d | Y0e | Y0f |
| Y10 | Y11 | Y12 | Y13 | Y14 | Y15 | Y16 | Y17 | Y18 | Y19 | Y1a | Y1b | Y1c | Y1d | Y1e | Y1f |
| Y20 | Y21 | Y22 | Y23 | Y24 | Y25 | Y26 | Y27 | Y28 | Y29 | Y2a | Y2b | Y2c | Y2d | Y2e | Y2f |
| Y30 | Y31 | Y32 | Y33 | Y34 | Y35 | Y36 | Y37 | Y38 | Y39 | Y3a | Y3b | Y3c | Y3d | Y3e | Y3f |
FIG. 6B
MSB                                                              LSB
| Y17 | Y16 | Y15 | Y14 | Y13 | Y12 | Y11 | Y10 | Y07 | Y06 | Y05 | Y04 | Y03 | Y02 | Y01 | Y00 |
| Y1f | Y1e | Y1d | Y1c | Y1b | Y1a | Y19 | Y18 | Y0f | Y0e | Y0d | Y0c | Y0b | Y0a | Y09 | Y08 |
| Y20 | Y36 | Y35 | Y34 | Y33 | Y32 | Y31 | Y30 | Y27 | Y26 | Y25 | Y24 | Y23 | Y22 | Y21 | Y20 |
| Y30 | Y3f | Y3d | Y3c | Y3b | Y3a | Y39 | Y38 | Y2f | Y2e | Y2d | Y2c | Y2b | Y2a | Y29 | Y28 |
FIG. 7A
| U00 V00 | | U02 V02 | | U04 V04 | | U06 V06 | | U08 V08 | | U0a V0a | | U0c V0c | | U0e V0e | |
| | | | | | | | | | | | | | | | |
| U20 V20 | | U22 V22 | | U24 V24 | | U26 V26 | | U28 V28 | | U2a V2a | | U2c V2c | | U2e V2c | |
| | | | | | | | | | | | | | | | |
FIG. 7B
MSB                                                              LSB
| V26 | V24 | V22 | V20 | U26 | U24 | U22 | U20 | V06 | V04 | V02 | V00 | U06 | U04 | U02 | U00 |
| V2e | V2c | V2a | V28 | U2e | U2c | U2a | U28 | V0e | V0c | V0a | V08 | U0e | U0c | U0a | U08 |

FIG. 8

| 0 | 4 | 0 | 4 |
|---|---|---|---|
| 1 | 5 | 1 | 5 |
| 2 | 6 | 2 | 6 |
| 3 | 7 | 3 | 7 |
| 4 | 0 | 4 | 0 |
| 5 | 1 | 5 | 1 |
| 6 | 2 | 6 | 2 |
| 7 | 3 | 7 | 3 |
| 0 | 4 | 0 | 4 |
| 1 | 5 | 1 | 5 |
| 2 | 6 | 2 | 6 |
| 3 | 7 | 3 | 7 |
| 4 | 0 | 4 | 0 |
| 5 | 1 | 5 | 1 |
| 6 | 2 | 6 | 2 |
| 7 | 3 | 7 | 3 |

FIG. 9

| 6 | 2 | 6 | 2 |
|---|---|---|---|
| 4 | 0 | 4 | 0 |
| 3 | 7 | 3 | 7 |
| 1 | 5 | 1 | 5 |
| 6 | 2 | 6 | 2 |
| 4 | 0 | 4 | 0 |
| 3 | 7 | 3 | 7 |
| 1 | 5 | 1 | 5 |

| 0 | 4 | 0 | 4 |
|---|---|---|---|
| 1 | 5 | 1 | 5 |
| 2 | 6 | 2 | 6 |
| 3 | 7 | 3 | 7 |
| 4 | 0 | 4 | 0 |
| 5 | 1 | 5 | 1 |
| 6 | 2 | 6 | 2 |
| 7 | 3 | 7 | 3 |
| 0 | 4 | 0 | 4 |
| 1 | 5 | 1 | 5 |
| 2 | 6 | 2 | 6 |
| 3 | 7 | 3 | 7 |
| 4 | 0 | 4 | 0 |
| 5 | 1 | 5 | 1 |
| 6 | 2 | 6 | 2 |
| 7 | 3 | 7 | 3 |

R1, R2, R4, R5

UV

| 6 | 2 | 6 | 2 |
|---|---|---|---|
| 4 | 0 | 4 | 0 |
| 3 | 7 | 3 | 7 |
| 1 | 5 | 1 | 5 |
| 6 | 2 | 6 | 2 |
| 4 | 0 | 4 | 0 |
| 3 | 7 | 3 | 7 |
| 1 | 5 | 1 | 5 |

| (y/4)%2 | y%4 | x%2 | |
|---|---|---|---|
| | | 0 | 1 |
| 0 | 0 | 0 | 4 |
| | 1 | 1 | 5 |
| | 2 | 2 | 6 |
| | 3 | 3 | 7 |
| 1 | 0 | 4 | 0 |
| | 1 | 5 | 1 |
| | 2 | 6 | 2 |
| | 3 | 7 | 3 |

FIG. 12

| (y/2)%4 | x%2 | |
|---|---|---|
| | 0 | 1 |
| 0 | 6 | 2 |
| 1 | 4 | 0 |
| 2 | 3 | 7 |
| 3 | 1 | 5 |

| 8×2 | 8×2 |
|---|---|
| 8×2 | 8×2 |

| 8×2 |
|---|

| 0 | 4 | 0 | 4 |
|---|---|---|---|
| 1 | 5 | 1 | 5 |
| 2 | 6 | 2 | 6 |
| 3 | 7 | 3 | 7 |
| 4 | 0 | 4 | 0 |
| 5 | 1 | 5 | 1 |
| 6 | 2 | 6 | 2 |
| 7 | 3 | 7 | 3 |
| 0 | 4 | 0 | 4 |
| 1 | 5 | 1 | 5 |
| 2 | 6 | 2 | 6 |
| 3 | 7 | 3 | 7 |
| 4 | 0 | 4 | 0 |
| 5 | 1 | 5 | 1 |
| 6 | 2 | 6 | 2 |
| 7 | 3 | 7 | 3 |

FIG. 22

| | R12 | | |
|---|---|---|---|
| 0 | 4 | 0 | 4 |
| 1 | 5 | 1 | 5 |
| 2 | 6 | 2 | 6 |
| 3 | 7 | 3 | 7 |
| 4 | 0 | 4 | 0 |
| 5 | 1 | 5 | 1 |
| 6 | 2 | 6 | 2 |
| 7 | 3 | 7 | 3 |
| 0 | 4 | 0 | 4 |
| 1 | 5 | 1 | 5 |
| 2 | 6 | 2 | 6 |
| 3 | 7 | 3 | 7 |
| 4 | 0 | 4 | 0 |
| 5 | 1 | 5 | 1 |
| 6 | 2 | 6 | 2 |
| 7 | 3 | 7 | 3 |

| 0 | 1 | 2 | 3 |
|---|---|---|---|
| 0 | 1 | 2 | 3 |
| 0 | 1 | 2 | 3 |
| 0 | 1 | 2 | 3 |
| 0 | 1 | 2 | 3 |
| 0 | 1 | 2 | 3 |
| 0 | 1 | 2 | 3 |
| 0 | 1 | 2 | 3 |
| 26 | 27 | 28 | 29 |
| 26 | 27 | 28 | 29 |
| 26 | 27 | 28 | 29 |
| 26 | 27 | 28 | 29 |
| 26 | 27 | 28 | 29 |
| 26 | 27 | 28 | 29 |
| 26 | 27 | 28 | 29 |
| 26 | 27 | 28 | 29 |

| | | | | G1 | | | | | | | | | | | G2 | | |
|---|---|---|---|---|---|---|---|---|---|---|---|---|---|---|---|---|---|
| 00 | 10 | 20 | 30 | 01 | 11 | 21 | 31 | 02 | 12 | 22 | 32 | | 03 | 13 | 23 | 33 |
| 40 | 50 | 60 | 70 | 41 | 51 | 61 | 71 | 42 | 52 | 62 | 72 | | 43 | 53 | 63 | 73 |
| 80 | 90 | a0 | b0 | 81 | 91 | a1 | b1 | 82 | 92 | a2 | b2 | | 83 | 93 | a3 | b3 |
| c0 | d0 | e0 | f0 | c1 | d1 | e1 | f1 | c2 | d2 | e2 | f2 | | c3 | d3 | e3 | f3 |
| 04 | 14 | 24 | 34 | 05 | 15 | 25 | 35 | 06 | 16 | 26 | 36 | | 07 | 17 | 27 | 37 |
| 44 | 54 | 64 | 74 | 45 | 55 | 65 | 75 | 46 | 56 | 66 | 76 | | 47 | 57 | 67 | 77 |
| 84 | 94 | a4 | b4 | 85 | 95 | a5 | b5 | 86 | 96 | a6 | b6 | | 87 | 97 | a7 | b7 |
| c4 | d4 | e4 | f4 | c5 | d5 | e5 | f5 | c6 | d6 | e6 | f6 | | c7 | d7 | e7 | f7 |
| 08 | 18 | 28 | 38 | 09 | 19 | 29 | 39 | 0a | 1a | 2a | 3a | | 0b | 1b | 2b | 3b |
| 48 | 58 | 68 | 78 | 49 | 59 | 69 | 79 | 4a | 5a | 6a | 7a | | 4b | 5b | 6b | 7b |
| 88 | 98 | a8 | b8 | 89 | 99 | a9 | b9 | 8a | 9a | aa | ba | | 8b | 9b | ab | bb |
| c8 | d8 | e8 | f8 | c9 | d9 | e9 | f9 | ca | da | ea | fa | | cb | db | eb | fb |

| | G2 | | | | G3 | | | | G4 | | |
|---|---|---|---|---|---|---|---|---|---|---|---|
| 0c | 1c | 2c | 3c | 0d | 1d | 2d | 3d | 0e | 1e | 2e | 3e | 0f | 1f | 2f | 3f |
| 4c | 5c | 6c | 7c | 4d | 5d | 6d | 7d | 4e | 5e | 6e | 7e | 4f | 5f | 6f | 7f |
| 8c | 9c | ac | bc | 8d | 9d | ad | bd | 8e | 9e | ae | be | 8f | 9f | af | bf |
| cc | dc | ec | fc | cd | dd | ed | fd | ce | de | ee | fe | cf | df | ef | ff |

FIG. 33

| 00 | 10 | 20 | 30 | 01 | 11 | 21 | 31 | 02 | 12 | 22 | 32 |
|----|----|----|----|----|----|----|----|----|----|----|----|
| 40 | 50 | 60 | 70 | 41 | 51 | 61 | 71 | 42 | 52 | 62 | 72 |
| 80 | 90 | a0 | b0 | 81 | 91 | a1 | b1 | 82 | 92 | a2 | b2 |
| c0 | d0 | e0 | f0 | c1 | d1 | e1 | f1 | c2 | d2 | e2 | f2 |
| 04 | 14 | 24 | 34 | 05 | 15 | 25 | 35 | 06 | 16 | 26 | 36 |
| 44 | 54 | 64 | 74 | 45 | 55 | 65 | 75 | 46 | 56 | 66 | 76 |
| 84 | 94 | a4 | b4 | 85 | 95 | a5 | b5 | 86 | 96 | a6 | b6 |
| c4 | d4 | e4 | f4 | c5 | d5 | e5 | f5 | c6 | d6 | e6 | f6 |
| 08 | 18 | 28 | 38 | 09 | 19 | 29 | 39 | 0a | 1a | 2a | 3a |
| 48 | 58 | 68 | 78 | 49 | 59 | 69 | 79 | 4a | 5a | 6a | 7a |
| 88 | 98 | a8 | b8 | 89 | 99 | a9 | b9 | 8a | 9a | aa | ba |
| c8 | d8 | e8 | f8 | c9 | d9 | e9 | f9 | ca | da | ea | fa |

G1, R21

| 03 | 13 | 23 | 33 |
|----|----|----|----|
| 43 | 53 | 63 | 73 |
| 83 | 93 | a3 | b3 |
| c3 | d3 | e3 | f3 |
| 07 | 17 | 27 | 37 |
| 47 | 57 | 67 | 77 |
| 87 | 97 | a7 | b7 |
| c7 | d7 | e7 | f7 |
| 0b | 1b | 2b | 3b |
| 4b | 5b | 6b | 7b |
| 8b | 9b | ab | bb |
| cb | db | eb | fb |

G2, R22

| 0c | 1c | 2c | 3c |
|----|----|----|----|
| 4c | 5c | 6c | 7c |
| 8c | 9c | ac | bc |
| cc | dc | ec | fc |

G2

| 0d | 1d | 2d | 3d |
|----|----|----|----|
| 4d | 5d | 6d | 7d |
| 8d | 9d | ad | bd |
| cd | dd | ed | fd |

G3, R23

| 0e | 1e | 2e | 3e | 0f | 1f | 2f | 3f |
|----|----|----|----|----|----|----|----|
| 4e | 5e | 6e | 7e | 4f | 5f | 6f | 7f |
| 8e | 9e | ae | be | 8f | 9f | af | bf |
| ce | de | ee | fe | cf | df | ef | ff |

| 00 | 10 | 20 | 30 | 01 | 11 | 21 | 31 | 02 | 12 | 22 | 32 |
|----|----|----|----|----|----|----|----|----|----|----|----|
| 40 | 50 | 60 | 70 | 41 | 51 | 61 | 71 | 42 | 52 | 62 | 72 |
| 80 | 90 | a0 | b0 | 81 | 91 | a1 | b1 | 82 | 92 | a2 | b2 |
| c0 | d0 | e0 | f0 | c1 | d1 | e1 | f1 | c2 | d2 | e2 | f2 |
| 04 | 14 | 24 | 34 | 05 | 15 | 25 | 35 | 06 | 16 | 26 | 36 |
| 44 | 54 | 64 | 74 | 45 | 55 | 65 | 75 | 46 | 56 | 66 | 76 |
| 84 | 94 | a4 | b4 | 85 | 95 | a5 | b5 | 86 | 96 | a6 | b6 |
| c4 | d4 | e4 | f4 | c5 | d5 | e5 | f5 | c6 | d6 | e6 | f6 |
| 08 | 18 | 28 | 38 | 09 | 19 | 29 | 39 | 0a | 1a | 2a | 3a |
| 48 | 58 | 68 | 78 | 49 | 59 | 69 | 79 | 4a | 5a | 6a | 7a |
| 88 | 98 | a8 | b8 | 89 | 99 | a9 | b9 | 8a | 9a | aa | ba |
| c8 | d8 | e8 | f8 | c9 | d9 | e9 | f9 | ca | da | ea | fa |

| 00 | 10 | 20 | 30 | 01 | 11 | 21 | 31 | 02 | 12 | 22 | 32 |
|----|----|----|----|----|----|----|----|----|----|----|----|
| 40 | 50 | 60 | 70 | 41 | 51 | 61 | 71 | 42 | 52 | 62 | 72 |
| 80 | 90 | a0 | b0 | 81 | 91 | a1 | b1 | 82 | 92 | a2 | b2 |
| c0 | d0 | e0 | f0 | c1 | d1 | e1 | f1 | c2 | d2 | e2 | f2 |
| 04 | 14 | 24 | 34 | 05 | 15 | 25 | 35 | 06 | 16 | 26 | 36 |
| 44 | 54 | 64 | 74 | 45 | 55 | 65 | 75 | 46 | 56 | 66 | 76 |
| 84 | 94 | a4 | b4 | 85 | 95 | a5 | b5 | 86 | 96 | a6 | b6 |
| c4 | d4 | e4 | f4 | c5 | d5 | e5 | f5 | c6 | d6 | e6 | f6 |
| 08 | 18 | 28 | 38 | 09 | 19 | 29 | 39 | 0a | 1a | 2a | 3a |
| 48 | 58 | 68 | 78 | 49 | 59 | 69 | 79 | 4a | 5a | 6a | 7a |
| 88 | 98 | a8 | b8 | 89 | 99 | a9 | b9 | 8a | 9a | aa | ba |
| c8 | d8 | e8 | f8 | c9 | d9 | e9 | f9 | ca | da | ea | fa |

| 00 | 10 | 20 | 30 | 01 | 11 | 21 | 31 | 02 | 12 | 22 | 32 |
|----|----|----|----|----|----|----|----|----|----|----|----|
| 40 | 50 | 60 | 70 | 41 | 51 | 61 | 71 | 42 | 52 | 62 | 72 |
| 80 | 90 | a0 | b0 | 81 | 91 | a1 | b1 | 82 | 92 | a2 | b2 |
| c0 | d0 | e0 | f0 | c1 | d1 | e1 | f1 | c2 | d2 | e2 | f2 |
| 04 | 14 | 24 | 34 | 05 | 15 | 25 | 35 | 06 | 16 | 26 | 36 |
| 44 | 54 | 64 | 74 | 45 | 55 | 65 | 75 | 46 | 56 | 66 | 76 |
| 84 | 94 | a4 | b4 | 85 | 95 | a5 | b5 | 86 | 96 | a6 | b6 |
| c4 | d4 | e4 | f4 | c5 | d5 | e5 | f5 | c6 | d6 | e6 | f6 |
| 08 | 18 | 28 | 38 | 09 | 19 | 29 | 39 | 0a | 1a | 2a | 3a |
| 48 | 58 | 68 | 78 | 49 | 59 | 69 | 79 | 4a | 5a | 6a | 7a |
| 88 | 98 | a8 | b8 | 89 | 99 | a9 | b9 | 8a | 9a | aa | ba |
| c8 | d8 | e8 | f8 | c9 | d9 | e9 | f9 | ca | da | ea | fa |

| 00 | 10 | 20 | 30 | 01 | 11 | 21 | 31 | 02 | 12 | 22 | 32 |
|----|----|----|----|----|----|----|----|----|----|----|----|
| 40 | 50 | 60 | 70 | 41 | 51 | 61 | 71 | 42 | 52 | 62 | 72 |
| 80 | 90 | a0 | b0 | 81 | 91 | a1 | b1 | 82 | 92 | a2 | b2 |
| c0 | d0 | e0 | f0 | c1 | d1 | e1 | f1 | c2 | d2 | e2 | f2 |
| 04 | 14 | 24 | 34 | 05 | 15 | 25 | 35 | 06 | 16 | 26 | 36 |
| 44 | 54 | 64 | 74 | 45 | 55 | 65 | 75 | 46 | 56 | 66 | 76 |
| 84 | 94 | a4 | b4 | 85 | 95 | a5 | b5 | 86 | 96 | a6 | b6 |
| c4 | d4 | e4 | f4 | c5 | d5 | e5 | f5 | c6 | d6 | e6 | f6 |
| 08 | 18 | 28 | 38 | 09 | 19 | 29 | 39 | 0a | 1a | 2a | 3a |
| 48 | 58 | 68 | 78 | 49 | 59 | 69 | 79 | 4a | 5a | 6a | 7a |
| 88 | 98 | a8 | b8 | 89 | 99 | a9 | b9 | 8a | 9a | aa | ba |
| c8 | d8 | e8 | f8 | c9 | d9 | e9 | f9 | ca | da | ea | fa |

| 03 | 13 | 23 | 33 | 07 | 17 | 27 | 37 |
|----|----|----|----|----|----|----|----|
| 43 | 53 | 63 | 73 | 47 | 57 | 67 | 77 |
| 83 | 93 | a3 | b3 | 87 | 97 | a7 | b7 |
| c3 | d3 | e3 | f3 | c7 | d7 | e7 | f7 |
| 0b | 1b | 2b | 3b | 0c | 1c | 2c | 3c |
| 4b | 5b | 6b | 7b | 4c | 5c | 6c | 7c |
| 8b | 9b | ab | bb | 8c | 9c | ac | bc |
| cb | db | eb | fb | cc | dc | ec | fc |

| 0d | 1d | 2d | 3d |
|----|----|----|----|
| 4d | 5d | 6d | 7d |
| 8d | 9d | ad | bd |
| cd | dd | ed | fd |

IMAGE PROCESSOR FOR MOTION SEARCHES

TECHNICAL FIELD

The present invention relates to image processors, and more particularly, to an image processor that performs motion search referring to a reference image stored in an external memory.

BACKGROUND ART

Patent Literature 1 below, for example, describes an image processor of a background art. The image processor includes a frame memory configured with an SDRAM (Synchronous Dynamic Random Access Memory) and a motion search unit connected to the frame memory. The frame memory holds an image to be coded, a reference image for rough search, and a reference image for fine search. The reference image for rough search is produced in advance by reduction and stored in the frame memory. The motion search unit firstly reads an image to be coded and the reference image for rough search from the frame memory and performs motion search with these images, so as to obtain a motion vector as a result of rough search. Then the motion search unit reads the reference images of the areas surrounding this motion vector among the reference images for fine search from the frame memory and performs motion search with the image to be coded and this reference images, so as to obtain a motion vector as a result of fine search.

CITATION LIST

Patent Literature

Patent Literature 1: JP2007-96696A

SUMMARY OF THE INVENTION

Problems to be Solved by the Invention

The image processor described in the above Patent Literature 1, however, requires sending and receiving huge amount of data between the motion search unit and the frame memory. Moreover, the frame memory is configured with an SDRAM having a low operational speed. Thus latency is likely to occur when the motion search unit accesses the frame memory, resulting in an elongated time required for motion search as a whole.

The present invention has been made in view of such situation, and is directed to obtaining an image processor that achieves high-speed motion search with a simple configuration.

Means to Solve the Problems

An image processor according to a first aspect of the present invention performs motion search by referring to a first image stored in an external memory. The image processor includes a first internal memory accessible with a higher speed than an external memory and configured to hold a second image in a predetermined range of the first image, an image production unit configured to read an image in a predetermined range of the second image from the first internal memory and produce a third image for rough search based on the read image, a second internal memory accessible with a higher speed than the external memory and configured to hold the third image produced by the image production unit, a first search unit configured to read the third image from the second internal memory and perform first motion search based on the third image, and a second search unit configured to read a fourth image in a predetermined range of the second image from the first internal memory based on a search result by the first search unit and perform second motion search that is more detailed than the first motion search based on the fourth image.

In the image processor according to the first aspect, the image production unit produces a third image based on the image read from the first internal memory. The first search unit performs first motion search based on the third image read from the second internal memory. The second search unit performs second motion search based on the fourth image read from the first internal memory. Here, the first and the second internal memories are both accessible with a higher speed than the external memory. Thus in comparison with reads of an image from the external memory by the image production unit, the first search unit, and the second search unit, time required for reads is shortened, and thus high-speed motion search is achieved as a whole.

An image processor according to a second aspect of the present invention is the image processor according to the first aspect. The image processor further includes a third internal memory accessible with a higher speed than the external memory, a transfer unit configured to read a fifth image of a predetermined range in the second image from the first internal memory based on a search result by the second search unit and store the fifth image in the third internal memory, and a third search unit configured to read the fifth image from the third internal memory and perform third motion search that is more detailed than the second motion search based on the fifth image.

In the image processor according to the second aspect, the transfer unit stores the fifth image read from the first internal memory in the second internal memory. The third search unit performs the third motion search based on the fifth image read from the third internal memory. Here, the third internal memory is accessible with a higher speed than the external memory. Thus in comparison with reads of an image from the external memory by the transfer unit and the third search unit, time required for reads is shortened, and thus high-speed motion search is achieved as a whole.

An image processor according to a third aspect of the present invention is the image processor according to the first or second aspect. The second image includes luminance and chrominance data. A unit storage area of the first internal memory holds a unit luminance data piece equivalent of luminance data of 8 columns×2 rows in a pixel space or a unit chrominance data piece equivalent of chrominance data of 8 columns×4 rows in a pixel space.

In the image processor according to the third aspect, the unit storage area of the first internal memory holds the unit luminance data piece equivalent of luminance data of 8 columns×2 rows in a pixel space or a unit chrominance data piece equivalent of chrominance data of 8 columns×4 rows in a pixel space. Thus a unit luminance data piece of 8 columns×2 rows to be stored in a unit storage area of the second internal memory and a unit luminance data piece of 4 columns×4 rows to be stored in a unit storage area of the third internal memory can be produced easily based on the unit luminance data piece stored in the unit storage area of the first internal memory.

An image processor according to a fourth aspect of the present invention is the image processor according to the third aspect. The first internal memory includes a plurality of memory banks, the memory banks being configured to hold eight pieces of unit luminance data aligned in two columns by four rows separately.

In the image processor according to the fourth aspect, eight pieces of unit luminance data aligned in two columns by four rows are stored in different memory banks in the first internal memory. Thus these eight pieces of unit luminance data can be written to and read from the first internal memory simultaneously.

An image processor according to a fifth aspect of the present invention is the image processor according the third or fourth aspects. The first internal memory includes a plurality of memory banks, the memory banks being configured to hold eight pieces of unit luminance data aligned in one column by eight rows separately.

In the image processor according to the fifth aspect, eight pieces of unit luminance data aligned in one column by eight rows are stored in different memory banks in the first internal memory. Thus theses eight pieces of unit luminance data can be written to and read from the first internal memory simultaneously.

An image processor according to a sixth aspect of the present invention is the image processor according to any one of the third to fifth aspects. The first internal memory includes a plurality of memory banks, the memory banks being configured to hold eight pieces of unit chrominance data aligned in two columns by four rows separately.

In the image processor according to the sixth aspect, eight pieces of unit chrominance data aligned in two columns by four rows are stored in different memory banks in the first internal memory. Thus these eight pieces of unit chrominance data can be written to and read from the first internal memory simultaneously.

An image processor according to a seventh aspect of the present invention is the image processor according to any one of the third to sixth aspects. The first internal memory includes a plurality of memory banks, the memory banks being configured to hold four pieces of unit luminance data aligned in one column by four rows and two pieces of unit chrominance data aligned in one column by two rows separately.

In the image processor according to the seventh aspect, four pieces of unit luminance data aligned in one column by four rows and two pieces of unit chrominance data aligned in one column by two rows are stored in different memory banks in the first internal memory. Thus these four pieces of unit luminance data and two pieces of unit chrominance data can be written to and read from the first internal memory simultaneously.

An image processor according to an eighth aspect of the present invention is the image processor according to any one of the third to seventh aspects. The first internal memory includes a plurality of memory banks, the memory banks being configured to hold four pieces of unit luminance data aligned in two columns by two rows and two pieces of unit chrominance data aligned in two columns by one row separately.

In the image processor according to the eighth aspect, four pieces of unit luminance data aligned in two columns by two rows and two pieces of unit chrominance data aligned in two columns by one row are stored in different memory banks of the first internal memory. Thus these four pieces of unit luminance data and two pieces of unit chrominance data can be written to and read from the first internal memory simultaneously.

An image processor according to a ninth aspect of the present invention is the image processor according to any one of the third to eighth aspects. The first internal memory includes a plurality of memory banks. The image processor further includes a first address setting unit configured to set a memory bank for storing each of the unit luminance and chrominance data pieces among the memory banks, based on a positional coordinate of the unit luminance and chrominance data pieces in a pixel space.

In the image processor according to the ninth aspect, the first address setting unit sets a memory bank for storing each of the unit luminance and chrominance data pieces among the plurality of memory banks of the first internal memory, based on positional coordinates of the unit luminance and chrominance data pieces in a pixel space. Thus each of the unit luminance and chrominance data pieces is stored in an appropriate memory bank.

An image processor according to a 10-th aspect of the present invention is the image processor according to the ninth aspect. The first address setting unit further sets an address in the memory bank for storing each of the unit luminance and chrominance data pieces, based on the positional coordinate of the unit luminance and chrominance data pieces in the pixel space.

In the image processor according to the 10-th aspect, the first address setting unit further sets an address in the memory bank for storing each of the unit luminance and chrominance data pieces, based on the positional coordinate of the unit luminance and chrominance data pieces in the pixel space. Thus the unit luminance and chrominance data pieces are stored at an appropriate address in the memory bank.

An image processor according to an 11-th aspect of the present invention is the image processor according to any one of the third to 10-th aspects. A read and a write of data from and to the first internal memory are performed on a time division basis.

In the image processor according to the 11-th aspect, a read and write of data from and to the first internal memory are performed on a time division basis. Thus configuration of the first internal memory with a single-port RAM is realized, achieving reduction in a circuit size.

An image processor according to a 12-th aspect of the present invention is the image processor according to any one of the third to 11-th aspects. A vertical size of the second image is set in a unit of a predetermined number of rows, so that the first internal memory is enabled to hold one or a plurality of second images.

In the image processor according to the 12-th aspect, a vertical size of the second image is set in a unit of a predetermined number of rows, so that the first internal memory is enabled to hold one ore a plurality of second images. This realizes motion search not only with a single reference image but also with multiple reference images.

An image processor according to a 13-th aspect of the present invention is the image processor according to any one of the third to 12-th aspects. While motion search targeting a current macroblock is performed, luminance and chrominance data in an area for processing a subsequent current macroblock is written to the first internal memory.

In the image processor according to the 13-th aspect, while motion search targeting a current macroblock is performed, luminance and chrominance data for processing a subsequent current macroblock is written to the first internal memory. Thus upon completion of motion search targeting a current macroblock, processing of a subsequent current macroblock is started without delay.

An image processor according to a 14-th aspect of the present invention is the image processor according to any one of third to 13-th aspects. The image production unit produces one piece of unit luminance data of 8 columns×2 rows in a pixel space, based on four pieces of unit luminance data aligned in two columns by two rows in the first internal memory, and stores the unit luminance data piece in a unit storage area of the second internal memory.

In the image processor according to the 14-th aspect, the image production unit produces one piece of unit luminance data of 8 columns×2 rows in a pixel space, based on four pieces of unit luminance data aligned in two columns by two rows in the first internal memory. This facilitates producing a reduced image to be produced by reducing an image stored in the first internal memory to ¼.

An image processor according to a 15-th aspect of the present invention is the image processor according to the 14-th aspect. The second internal memory includes a plurality of memory banks, the memory banks being configured to hold eight pieces of unit luminance data aligned in two columns by four rows separately.

In the image processor according to the 15-th aspect, eight pieces of unit luminance data aligned in two columns by four rows are stored in different memory banks of the second internal memory. Thus these eight pieces of unit luminance data can be written to the second internal memory simultaneously and read from the first internal memory simultaneously.

An image processor according to a 16-th aspect of the present invention is the image processor according to the 14-th or 15-th aspect. The second internal memory includes a plurality of memory banks, the memory banks being configured to hold eight pieces of unit luminance data aligned in one column by eight rows separately.

In the image processor according to the 16-th aspect, eight pieces of unit luminance data aligned in one column by eight rows are stored in different memory banks of the second internal memory. Thus these eight pieces of unit luminance data can be written to the second internal memory simultaneously and read from the first internal memory simultaneously.

An image processor according to a 17-th aspect of the present invention is the image processor according to any one of the 14-th to 16-th aspects. The second internal memory includes a plurality of memory banks. The image processor further includes a second address setting unit configured to set a memory bank for storing each unit luminance data piece among the memory banks, based on a positional coordinate of the unit luminance data piece in a pixel space.

In the image processor according to the 17-th aspect, the second internal memory includes a plurality of memory banks, and the second address setting unit sets a memory bank for storing each unit luminance data piece among the memory banks, based on a positional coordinate of the unit luminance data piece in a pixel space. Thus the unit luminance data pieces are stored in an appropriate memory bank.

An image processor according to an 18-th aspect of the present invention is the image processor according to the 17-th aspect. The second address setting unit further sets an address in the memory bank for storing each unit luminance data piece, based on the positional coordinate of the unit luminance data piece in the pixel space.

In the image processor according to the 18-th aspect, the second address setting unit sets an address in the memory bank for storing each unit luminance data piece, based on the positional coordinate of the unit luminance data piece in the pixel space. Thus the unit luminance data piece is stored at an appropriate address in the memory bank.

An image processor according to a 19-th aspect of the present invention is the image processor according to any one of the 14-th to 18-th aspects. A read and a write of data from and to the second internal memory are performed on a time division basis.

In the image processor according to the 19-th aspect, a read and a write of data from and to the second internal memory are performed on a time division basis. Thus configuration of the second internal memory with a single-port RAM is realized, achieving reduction in a circuit size.

An image processor according to a 20-th aspect of the present invention is the image processor according to any one of the 14-th to 19-th aspects. A vertical size of the third image is set in a unit of a predetermined number of rows, so that the second internal memory is enabled to hold one or a plurality of third images.

In the image processor according to the 20-th aspect, a vertical size of the third image is set in a unit of a predetermined number of rows, so that the second internal memory is enabled to hold one or a plurality of third images. This realizes motion search not only with a single reference image but also with multiple reference images.

An image processor according to a 21-st aspect of the present invention is the image processor according to any one of the 14-th to 20-th aspects. While motion search targeting a current macroblock is performed, luminance data in an area for processing a subsequent current macroblock is written to the second internal memory.

In the image processor according to the 21-st aspect, while motion search targeting a current macroblock is performed, luminance data in an area for processing a subsequent current macroblock is written to the second internal memory. Thus upon completion of motion search targeting a current macroblock, processing of a subsequent current macroblock is started without delay.

An image processor according to a 22-nd aspect of the present invention is the image processor according to any one of the third to 21-st aspects. The transfer unit generates two pieces of unit luminance data of 4 columns×4 rows in a pixel space, based on two pieces of unit luminance data aligned in one column by two rows of 8 columns×2 rows in the first internal memory, and stores the unit luminance data piece in a unit storage area of the third internal memory.

In the image processor according to the 22-nd aspect, the transfer unit generates two pieces of unit luminance data of 4 columns×4 rows in a pixel space, based on two pieces of unit luminance data aligned in one column by two rows in the first internal memory. This facilitates conversion from a unit luminance data piece of 8 columns×2 rows to a unit luminance data piece of 4 columns×4 rows.

An image processor according to a 23-rd aspect of the present invention is the image processor according to the 22-nd aspect. The third internal memory includes a plurality of memory banks, the memory banks being configured to hold 16 pieces of unit luminance data aligned in four columns by four rows separately.

In the image processor according to the 23-rd aspect, the 16 pieces of unit luminance data aligned in four columns by four rows are stored in different memory banks of the third internal memory. Thus these 16 pieces of unit luminance data can be written to and read from the third internal memory simultaneously.

An image processor according to a 24-th aspect of the present invention is the image processor according to the 22-nd or 23-rd aspect. The third internal memory includes a plurality of memory banks. The image processor further includes a third address setting unit configured to set a memory bank for storing each unit luminance data piece among the memory banks, based on a positional coordinate of the unit luminance data piece in a pixel space.

In the image processor according to the 24-th aspect, the third address setting unit sets a memory bank for storing each unit luminance data piece among the plurality of memory banks of the third internal memory, based on a positional coordinate of the unit luminance data piece in a pixel space. Thus each unit luminance data piece is stored in an appropriate memory bank.

An image processor according to a 25-th aspect of the present invention is the image processor according to the 24-th aspect. The third address setting unit further sets an address in the memory bank for storing each unit luminance data piece, based on the positional coordinate of the unit luminance data piece in the pixel space.

In the image processor according to the 25-th aspect, the third address setting unit sets an address in the memory bank for storing each unit luminance data piece, based on the positional coordinate in the unit luminance data piece in the pixel space. Thus each unit luminance data piece is stored at an appropriate address in the memory bank.

An image processor according to a 26-th aspect of the present invention is the image processor according to any one of the 23-th to 25-th aspects. The a plurality of memory banks of the third internal memory includes a plurality of memory banks belonging to a first set and a plurality of memory banks belonging to a second set. A read and a write of data from and to each of the first and second sets are performed on a time division basis.

In the image processor according to the 26-th aspect, a read and a write of data from and to each of the first and second sets of the third internal memory are performed on a time division basis. Thus configuration of the third internal memory with a single-port RAM is realized, achieving reduction in a circuit size.

An image processor according to a 27-th aspect of the present invention is the image processor according to the 26-th aspect. While a read of data from one of the first and second sets for motion search targeting a current macroblock is performed, data for motion search targeting a subsequent current macroblock is written to the other one of the first and second sets.

In the image processor according to the 27-th aspect, while a read of data from one of the first and second sets for motion search targeting a current macroblock is performed, data for motion search targeting a subsequent current macroblock is written to the other one of the first and second sets. Thus upon completion of motion search targeting a current macroblock, processing of a subsequent current macroblock is started without delay.

An image processor according to a 28-th aspect of the present invention is the image processor according to any one of the 22-nd to 27-th aspects. The third internal memory holds a predetermined number of unit luminance data pieces, in accordance with a macroblock part mode included in a search result by the second search unit.

In the image processor according to the 28-th aspect, the third internal memory holds a predetermined number of unit luminance data pieces, in accordance with a macroblock part mode included in a search result by the second search unit. Thus motion search by the third search unit is appropriately performed in accordance with a macroblock part mode.

An image processor according to a 29-th aspect of the present invention is the image processor according to any one of the 22-nd to 28-th aspects. The third internal memory further holds a reference image for a Skip/Direct vector and a reference image for a (0, 0) vector, based on a position of a current macroblock in a pixel space.

In the image processor according to the 29-th aspect, the third internal memory holds a reference image for a Skip/Direct vector and a reference image for a (0, 0) vector. This increases accuracy of motion search by the third search unit.

Effects of the Invention

The present invention achieves an image processor that achieves high-speed motion search with a simple configuration.

These and other objects, features, aspects and advantages of the present invention will become more apparent from the following detailed description of the present invention when taken in conjunction with the accompanying drawings.

BRIEF DESCRIPTION OF DRAWINGS

FIGS. 6A and 6B are diagrams for illustrating a rule for arranging luminance data to be stored in the LSRAM.

FIGS. 7A and 7B are diagrams for illustrating a rule for arranging chrominance data to be stored in the LSRAM.

FIG. 8 is a diagram for illustrating distribution of the luminance data among the memory banks in the LSRAM.

FIG. 9 is a diagram for illustrating distribution of the chrominance data among the memory banks in the LSRAM.

FIG. 10 is a diagram illustrating the luminance data in FIG. 8 and the chrominance data in FIG. 9 together.

FIG. 11 is a diagram for illustrating how the address generation unit sets the bank indexes of the luminance data.

FIG. 12 is a diagram illustrating how the address generation unit sets the bank indexes of the chrominance data.

FIG. 22 is a diagram illustrating the luminance data in FIG. 21.

FIG. 23 is a diagram illustrating an example of setting the bank address BA in the MSRAM.

FIG. 32 is a diagram for illustrating distribution of the luminance data among the memory banks in the SSRAM.

FIG. 33 is a diagram illustrating the luminance data in FIG. 32.

FIG. 34 is a diagram illustrating a storage area of a reference image in the SSRAM.

FIG. 35 is a diagram illustrating a storage area of a reference image in the SSRAM.

FIG. 36 is a diagram illustrating a storage area of a reference image in the SSRAM.

FIG. 37 is a diagram illustrating a storage area of a reference image in the SSRAM.

FIG. 38 is a diagram illustrating a storage area of a reference image in the SSRAM.

FIG. 39 is a diagram illustrating a storage area of a reference image in the SSRAM.

DESCRIPTION OF THE INVENTION

Figure 1:
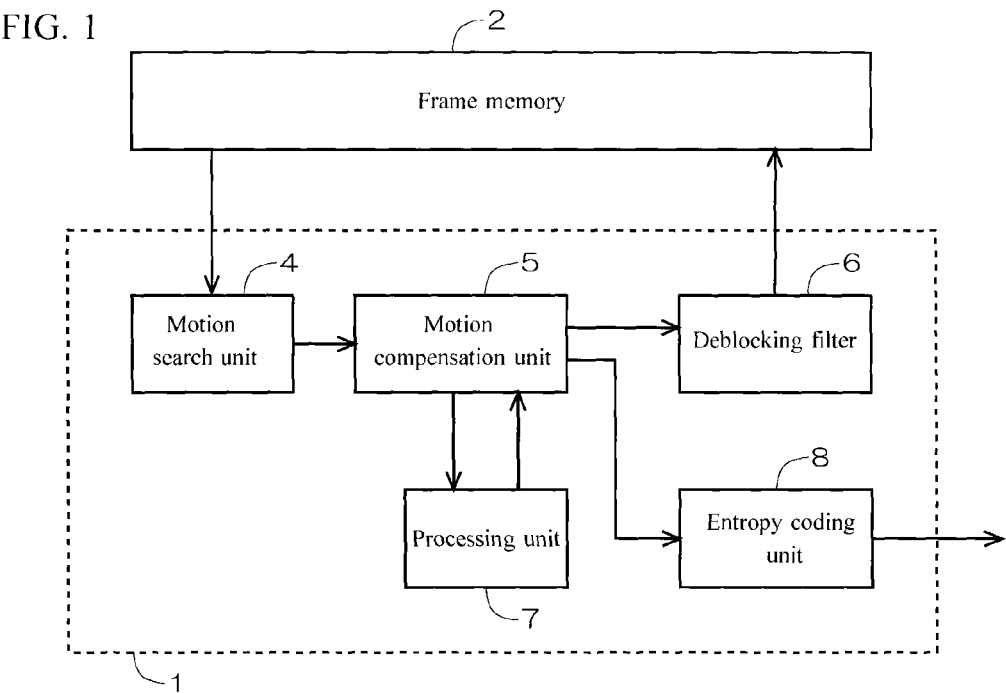
FIG. 1 is a diagram illustrating a configuration of an encoder according to an embodiment of the present invention.

Preferred embodiments of the present invention are described in detail below referring to the drawings. It should be noted that identical reference numerals throughout the drawings indicate identical or equivalent elements.

FIG. 1 is a diagram illustrating a configuration of an encoder 1 according to an embodiment of the present invention. The encoder 1 is an image processor in conformity with the H.264 standard, and is connected to a frame memory 2 which is an external memory. The frame memory 2 is configured with, for example, a Dynamic Random Access Memory (DRAM), being capable of holding one or multiple reference images. FIG. 1 illustrates a relation of connection of the encoder 1 including a motion search unit 4, a motion compensation unit 5, a deblocking filter 6, a processing unit 7, and an entropy coding unit 8. The processing unit 7 performs processes such as orthogonal transformation, quantization, and dequantization.

Figure 2:
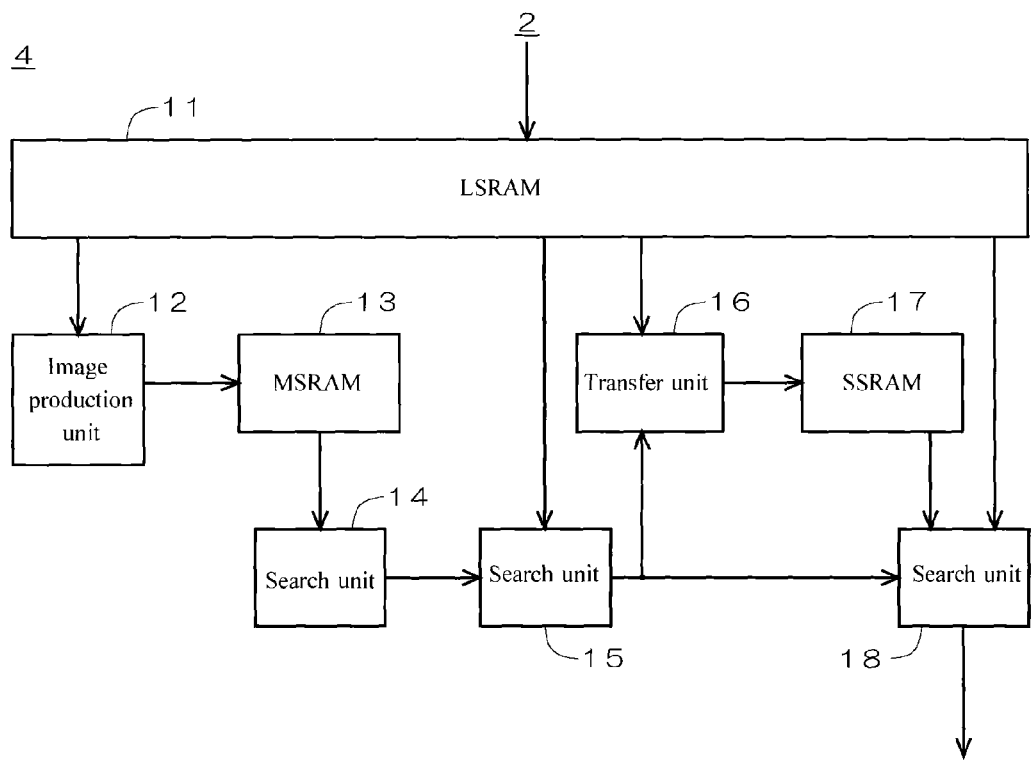
FIG. 2 is a diagram illustrating an internal configuration of a motion search unit in FIG. 1.

FIG. 2 is a diagram illustrating an internal configuration of the motion search unit 4 in FIG. 1. FIG. 2 illustrates a relation of connection of the motion search unit 4 including three Static Random Access Memories (SRAM) which are internal memories. In the present embodiment, the three SRAMs are respectively referred to as "LSRAM 11", "MSRAM 13", and "SSRAM 17" for simple distinction. The LSRAM 11, the MSRAM 13, and the SSRAM 17 are accessible with a higher speed than the frame memory 2. The motion search unit 4 includes an image production unit 12, search units 14, 15, and 18, and a transfer unit 16.

Written in the LSRAM 11 are luminance and chrominance images (second image) of a predetermined range in a reference image (first image) stored in the frame memory 2 by a Direct Memory Access (DMA) control. The image production unit 12 reads the luminance image of the predetermined range in the second image from the LSRAM 11 and resizes the image to ¼ to produce a reduced image (third image) for rough search. The third image produced by the image production unit 12 is stored in the MSRAM 13. The search unit 14 reads the third image from the MSRAM 13 and performs motion search (reduced pixel search) based on the third image. The result of the reduced pixel search by the search unit 14 is input to the search unit 15. The search unit 15 reads a luminance image (fourth image) of a predetermined range in the second image from the LSRAM 11 based on the input search result, and performs motion search (integer accuracy pixel search) that is more detailed than reduced pixel search, based on the fourth image. The result of the integer accuracy pixel search by the search unit 15 is input to the transfer unit 16 and the search unit 18. The transfer unit 16 reads a luminance image (fifth image) of a predetermined range in the second image from the LSRAM 11 based on the input search result, and stores the fifth image in the SSRAM 17. The search unit 18 reads the fifth image from the SSRAM 17, and performs motion search (decimal accuracy pixel search) that is more detailed than integer accuracy pixel search, based on the fifth image. The search unit 18 reads a chrominance image for interpolation from the LSRAM 11. Reduced pixel search by the search unit 14, integer accuracy pixel search by the search unit 15, and decimal accuracy pixel search by the search unit 18 are performed by macroblock pipelining.

Figure 3:
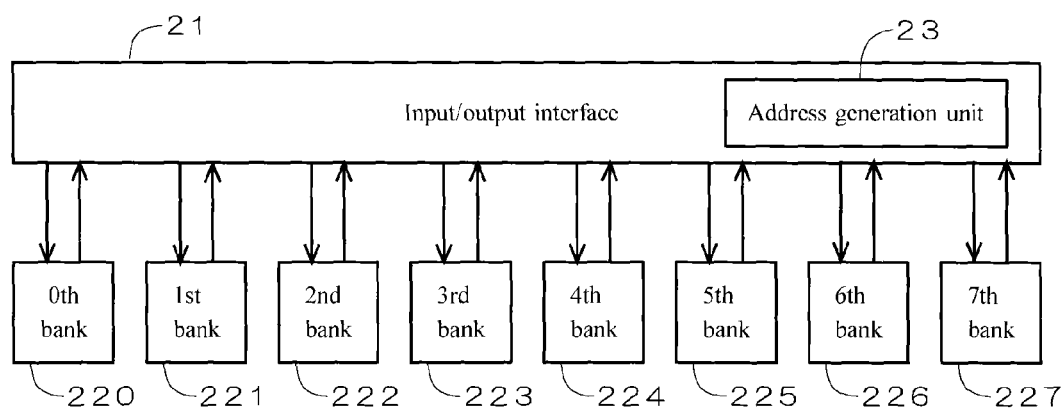
FIG. 3 is a diagram illustrating a configuration of a LSRAM.

FIG. 3 is a diagram illustrating a configuration of the LSRAM 11. The LSRAM 11 is split into multiple memory banks, being configured with eight memory banks in total including 0th bank 220 to seventh bank 227 in this example. An input/output interface 21 including an address generation unit 23 is connected to the memory banks. The LSRAM 11 switches a write of an image from the frame memory 2, a read of an image to the image production unit 12, a read of an image to the search unit 15, a read of an image to the transfer unit 16, and a read of an image to the search unit 18, on a time division basis. Simultaneous access to different memory banks is available, and the number of banks the memory is split into is set at such a number that these writes and reads on a time division basis are performed without delay.

Figure 4:
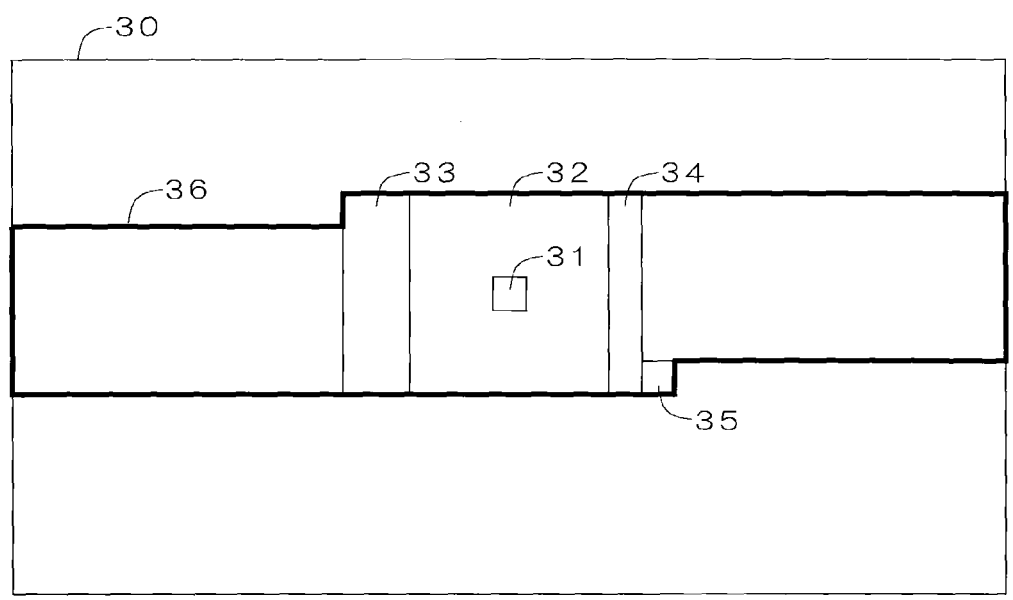
FIG. 4 is a diagram illustrating an example of a first image to be stored in the LSRAM.

FIG. 4 is a diagram illustrating a first example of an image to be stored in the LSRAM 11. In a storage area 36 indicated by the thick line in the figure, the LSRAM 11 holds image data (luminance and chrominance data) of 1920 columns×160 rows out of 1920 columns×1080 rows of a reference image 30. The storage area 36 includes a search window 32 around a current macroblock 31, an overlapping area 33 equivalent of delay in macroblock pipelining, and an update area 34 for resizing an image to be used during processing of a subsequent macroblock. An area 35 is image data to be written from the frame memory 2 to the LSRAM 11 in preparation for an update of the current macroblock.

Figure 5:
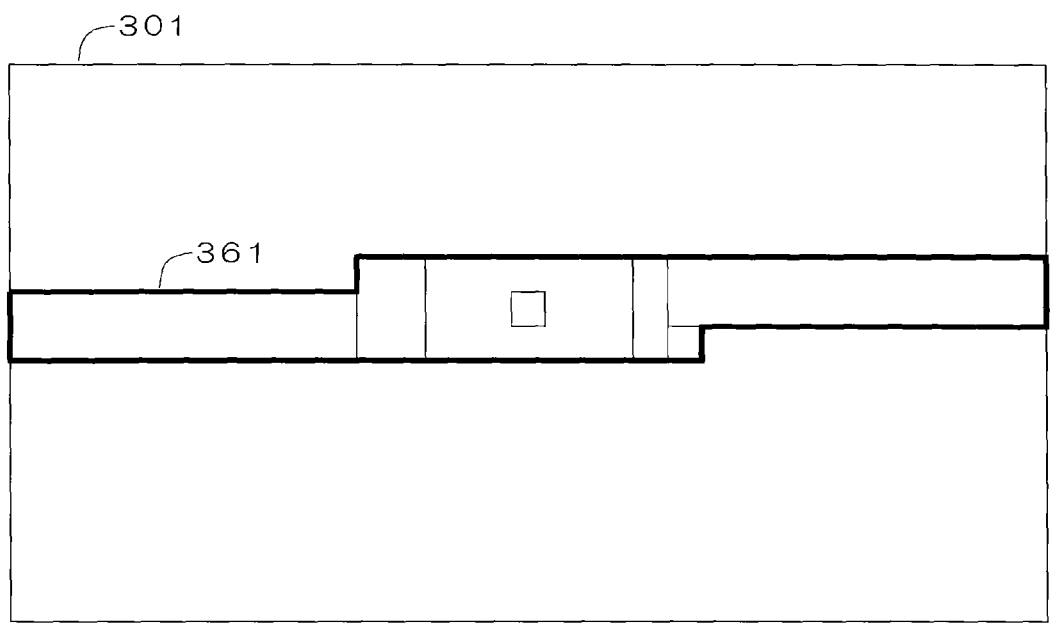
FIG. 5 is a diagram illustrating a second example of an image to be stored in the LSRAM.
Figure 5:
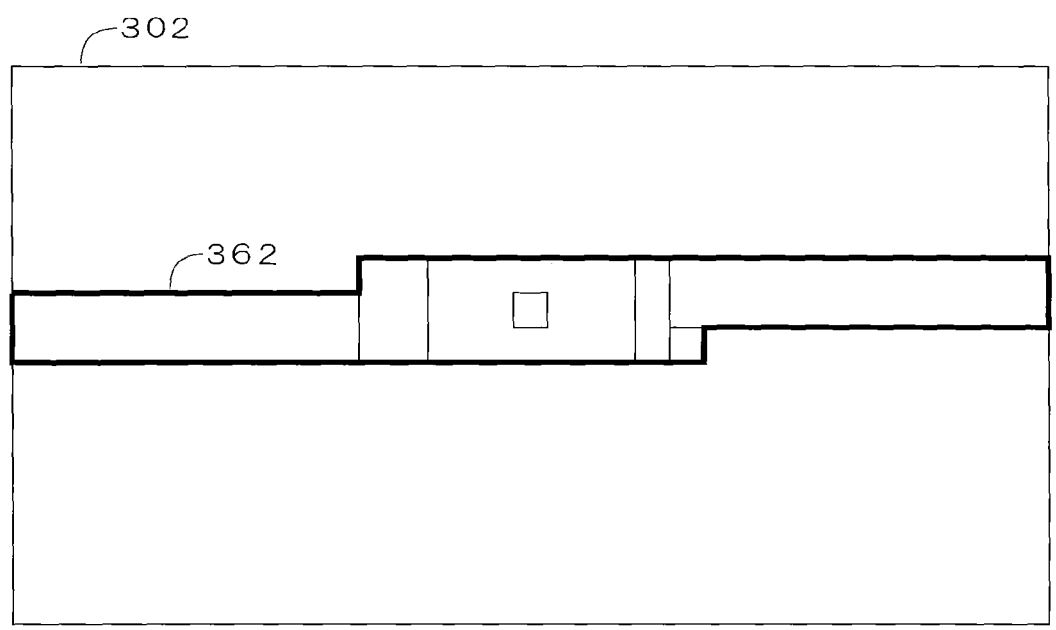

FIG. 5 is a diagram illustrating a second example of the image to be stored in the LSRAM 11. The height (vertical size) of the search window 32 can be set at an arbitrary number up to 160 rows in a unit of 8 rows. Thus in the presence of multiple reference images (two reference images 301 and 302 in the example of FIG. 5), the height of the search window 32 is set in accordance with the number of reference images, so that a storage area 361 in a reference image 301 and a storage area 362 in a reference image 302 are stored in the LSRAM 11.

FIGS. 6A and 6B are diagrams for illustrating a rule for arranging luminance data to be stored in the LSRAM 11. FIG. 6A illustrates a pixel space of 16 columns×4 rows in the image, and FIG. 6B illustrates a storage area of four words (that is, four unit storage areas) in the LSRAM 11. As illustrated in FIGS. 6A and 6B, the unit storage area of the LSRAM 11 holds a unit luminance data piece (hereinafter "8×2 packed word") equivalent of luminance data of 8 columns×2 rows in the pixel space. Each piece of the luminance data in the example of the present embodiment is 8 bits, and thus an 8×2 packed word and a word of the LSRAM 11 are both 128 bits.

FIGS. 7A and 7B are diagrams for illustrating a rule for arranging chrominance data to be stored in the LSRAM 11. FIG. 7A illustrates a pixel space of 16 columns×4 rows in the image, and FIG. 7B illustrates a storage area of two words (that is, two unit storage areas) in the LSRAM 11. As illustrated in FIGS. 7A and 7B, the unit storage area of the LSRAM 11 holds a unit chrominance data piece equivalent of chrominance data of 8 columns×4 rows in the pixel space. In the example of the present embodiment, image data in the YUV420 format is processed, and thus a pixel space of 8 columns×4 rows in luminance includes 16 chrominance data pieces (128 bits).

FIG. 8 is a diagram for illustrating distribution of the luminance data among the memory banks in the LSRAM 11. FIG. 8 illustrates 64 pieces of 8×2 packed words included in a pixel space of 32 columns×32 rows. The numbers in the figure indicate bank indexes allotted to the memory banks of the 0th bank 220 to the seventh bank 227. As illustrated in FIG. 8, luminance data pieces are distributed to the memory banks, so that arbitrary eight pieces of unit luminance data aligned in one column by eight rows are stored in different memory banks and arbitrary eight pieces of unit luminance data aligned in two columns by four rows are stored in different memory banks.

FIG. 9 is a diagram for illustrating distribution of the chrominance data among the memory banks in the LSRAM 11. FIG. 9 illustrates 32 pieces of 8×2 packed words included in a pixel space of 32 columns×32 rows in luminance. The numerals in the figure indicate bank indexes. As illustrated in FIG. 9, chrominance data pieces are distributed to the memory banks, so that arbitrary eight pieces of unit chrominance data aligned in two columns by four rows are stored in different memory banks.

FIG. 10 is a diagram illustrating the luminance data in FIG. 8 and the chrominance data in FIG. 9 together. The eight pieces of unit luminance data (1 column×8 rows) included in an area R1 can be read from or written to the LSRAM 11 simultaneously. The eight pieces of unit luminance data (2 columns×4 rows) included in an area R2 can be read from or written to the LSRAM 11 simultaneously. The eight pieces of unit chrominance data (2 columns×4 rows) included in an area R3 can be read from or written to the LSRAM 11 simultaneously. The four pieces of unit luminance data (2 columns×2 rows) and the two pieces of unit chrominance data (2 columns×1 row) included in an area R4 can be read from or written to the LSRAM 11 simultaneously. The four pieces of unit luminance data (1 column×4 rows) and the two unit chrominance data piece (1 column×2 rows) included in the area R5 can be read from or written to the LSRAM 11 simultaneously.

FIG. 11 is a diagram for illustrating how the address generation unit 23 sets the bank indexes of the luminance data. The address generation unit 23 sets the bank indexes of the packed words, based on a coordinate of column (x coordinate) and a coordinate of row (y coordinate) in a unit of a packed word in a pixel space. The sign "%" in the figure represents an operation to obtain a remainder. The remainder of division is dropped. For example, in writing a packed word of luminance data to the LSRAM 11, if the y coordinate is divided by "4" and the obtained value is further divided by "2" and the remainder is "0", while the remainder of the division of the y coordinate by "4" is "0", and the x coordinate is divided by "2" and the remainder is "0", the bank index BI for the packed word is set at "0", and the packed word is stored in the 0th bank 220 of the LSRAM 11.

The following formula represents the relation illustrated in FIG. 11:

$$BI=((x\%2)\hat{\ }((y/4)\%2))*4+(y\%4)$$

where "^" represents an operator to perform exclusive OR.

FIG. 12 is a diagram illustrating how the address generation unit 23 sets the bank indexes of the chrominance data. The address generation unit 23 sets the bank indexes of the packed words, based on x and y coordinates in a unit of a packed word in a pixel space. For example, in writing a packed word of chrominance data to the LSRAM 11, if the y coordinate is divided by "2" and the obtained value is further divide by "4", and the remainder is "1", and the x coordinate is divided by "2" and the remainder is "0", the bank index BI for the packed word is set at "4", and the packed word is stored in the fourth bank 224 of the LSRAM 11.

The following formula represents the relation illustrated in FIG. 12:

$$BI=((((y/4)\%2)==(x\%2))<<2)+((\sim((y/2)\%2))<<1)+((y/4)\%2)$$

where "~" represents an operator to perform bitwise inversion.

The address generation unit 23 sets an address in the memory bank (bank address BA) for storing the packed words, based on x and y coordinates in a unit of a packed word in a pixel space. In the memory banks, the area in the first two-thirds (BA="0"~"2559") holds the luminance data, and the area in the latter one-third (BA="2560"~"3839") holds the chrominance data.

A formula for setting the bank address of the luminance data is represented as follows:

$$BA=(x/2)+(y/4)*128$$

A formula for setting the bank address of the chrominance data is represented as follows:

$$BA=(x/2)+(y/8)*128+2560$$

FIGS. 13 to 16 are diagrams for illustrating a rule for updating image data to be written from the frame memory 2 to the LSRAM 11. While motion search targeting a current macroblock is performed, image data in an area for processing a subsequent current macroblock is written from the frame memory 2 to the LSRAM 11.

Figure 13:
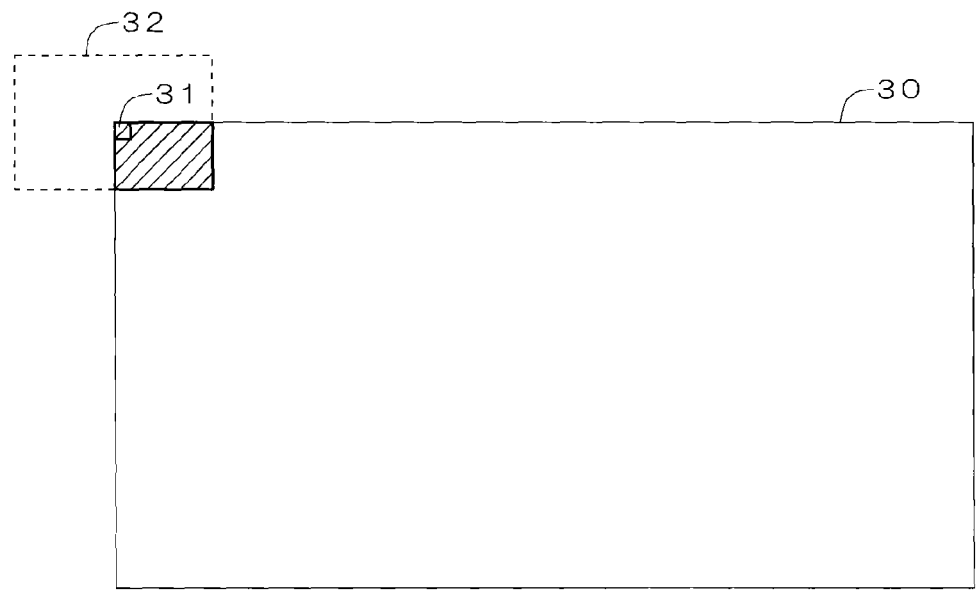
FIG. 13 is a diagram for illustrating a rule for updating image data to be written from the frame memory to the LSRAM.

Referring to FIG. 13, the current macroblock 31 is located at the top-left corner of the reference image 30 when processing starts. Here, the image data in a range where the search window 32 overlaps the reference image 30 (diagonally shaded area) is written from the frame memory 2 to the LSRAM 11.

Figure 14:
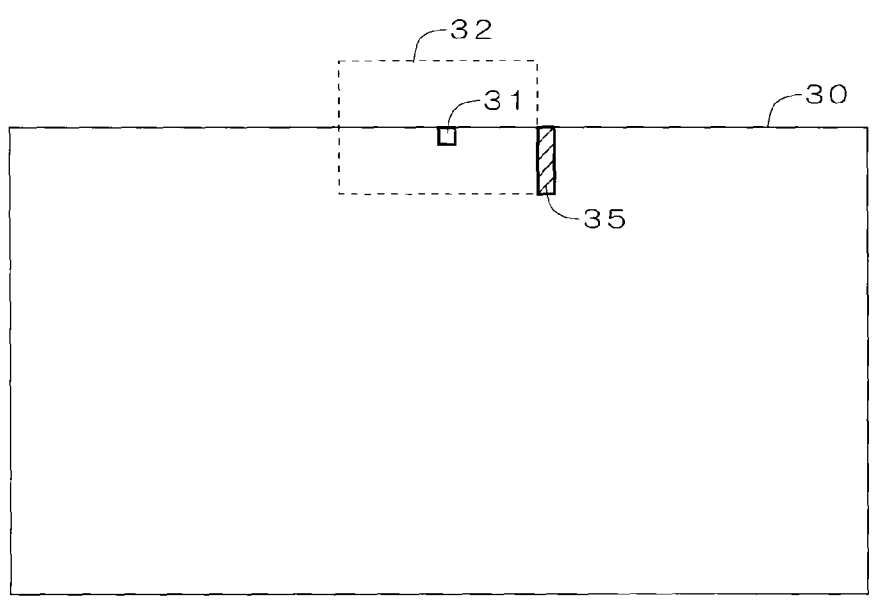
FIG. 14 is a diagram for illustrating a rule for updating image data to be written from the frame memory to the LSRAM.

Referring to FIG. 14, when the current macroblock 31 is on the upper side of the reference image 30, the image data of an area 35 in the reference image 30 and on the right side of the search window 32 is written from the frame memory 2 to the LSRAM 11.

Figure 15:
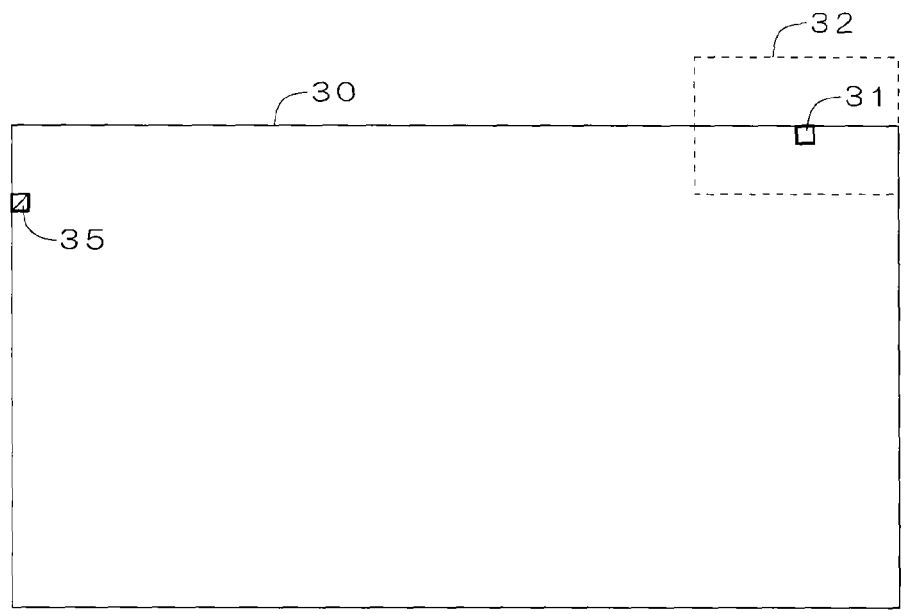
FIG. 15 is a diagram for illustrating a rule for updating image data to be written from the frame memory to the LSRAM.

Referring to FIG. 15, when the right side of the search window 32 is on the right side of the reference image 30, the image data of an area 35 equivalent of one macroblock located one macroblock line below the bottom of the search window 32 and on the left side of the reference image 30 is written from the frame memory 2 to the LSRAM 11.

Figure 16:
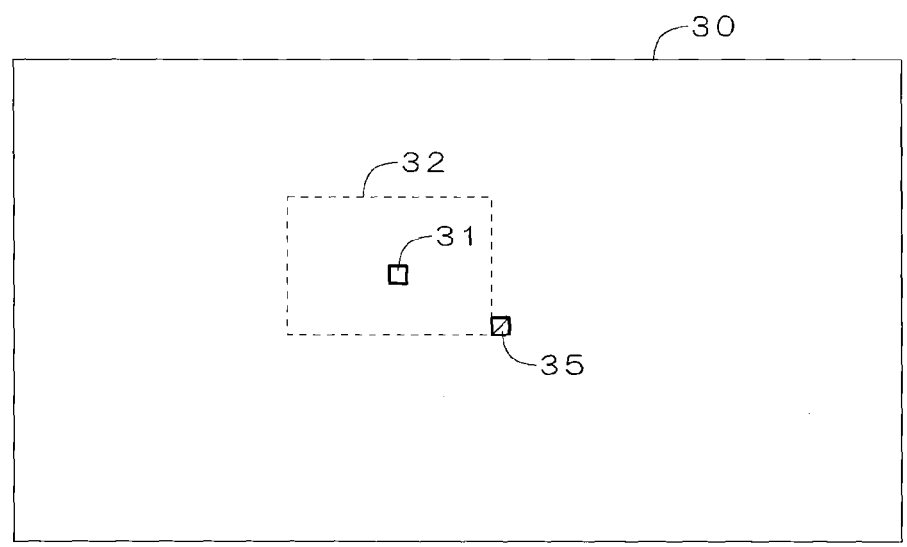
FIG. 16 is a diagram for illustrating a rule for updating image data to be written from the frame memory to the LSRAM.

Referring to FIG. 16, in a normal update when the current macroblock 31 is around the center of the reference image 30, the image data of an area 35 equivalent of one macroblock on the bottom-right corner of the search window 32 is written from the frame memory 2 to the LSRAM 11.

Figure 17:
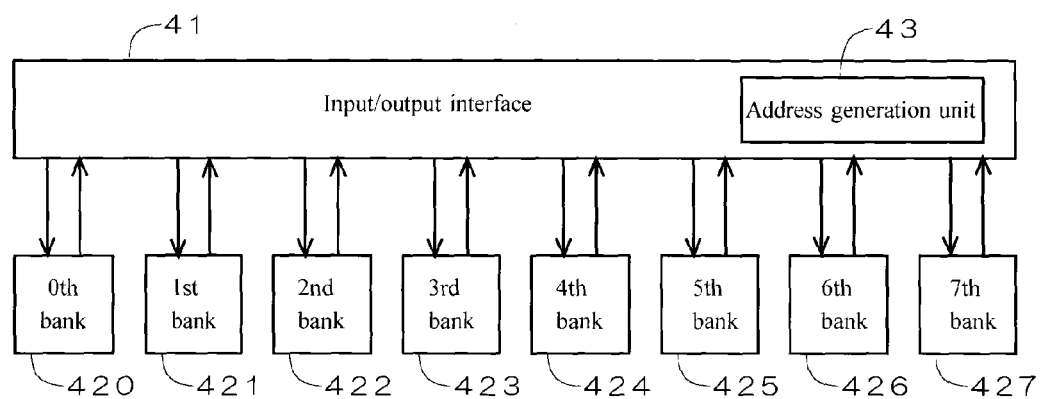
FIG. 17 is a diagram illustrating a configuration of the MSRAM

FIG. 17 is a diagram illustrating a configuration of the MSRAM 13. The MSRAM 13 is split into multiple memory banks, being configured with eight memory banks in total including 0th bank 420 to seventh bank 427 in this example. An input/output interface 41 including an address generation unit 43 is connected to the memory banks. The MSRAM 13 switches a write of an image from the image production unit 12 and a read of an image to the search unit 14 on a time division basis. Simultaneous access to different memory banks is available, and the number of banks the memory is split into is set at such a number that these writes and reads on a time division basis are performed without delay.

Figure 18:
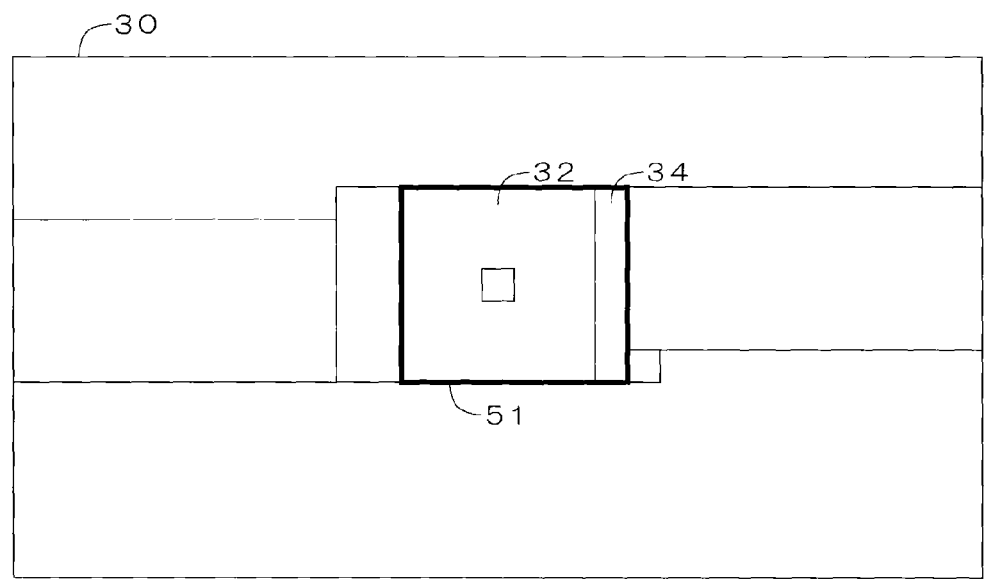
FIG. 18 is a diagram illustrating a first example of an image to be stored in the MSRAM.

FIG. 18 is a diagram illustrating a first example of an image to be stored in the MSRAM 13. In a storage area 51 indicated by the in the thick line figure, the MSRAM 13 holds luminance data obtained by reducing the images of the search window 32 and the update area 34 to ¼ (½ each vertically and horizontally).

Figure 19:
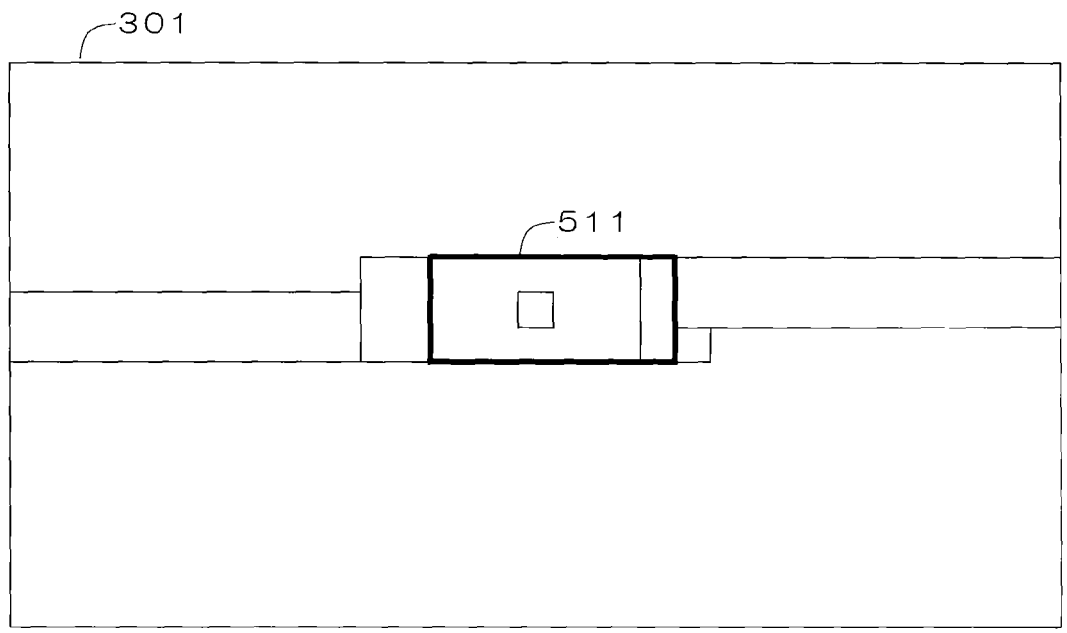
FIG. 19 is a diagram illustrating a second example of the image to be stored in the MSRAM.
Figure 19:
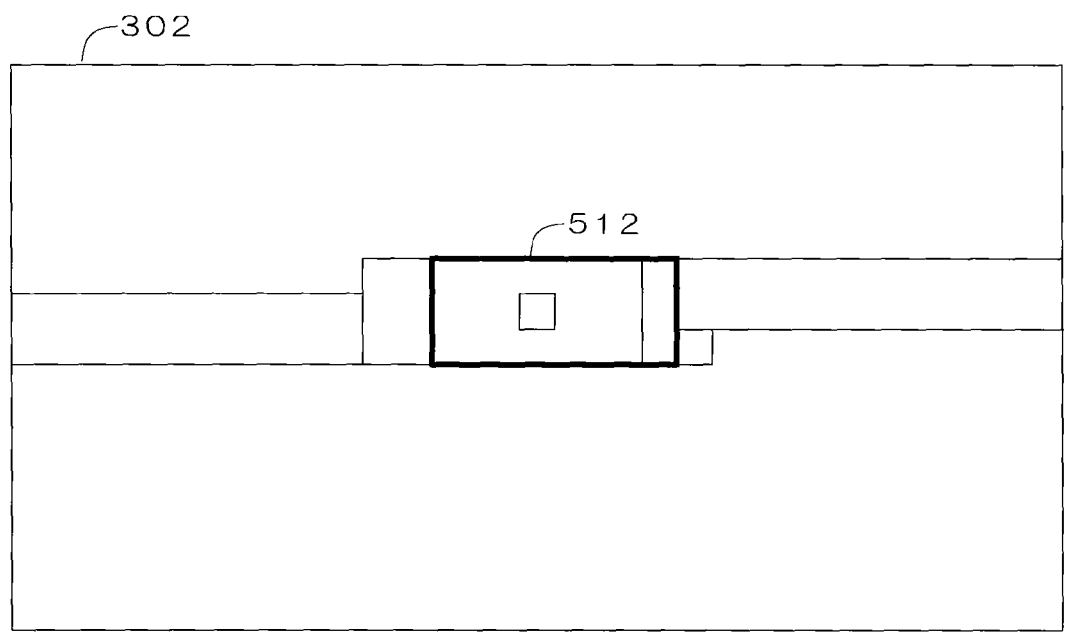

FIG. 19 is a diagram illustrating a second example of the image to be stored in the MSRAM 13. The MSRAM 13 allows the height of the search window 32 to be set at an arbitrary number up to 80 rows in a unit of 4 rows. Thus in the presence of multiple reference images (two reference images 301 and 302 in the example of FIG. 19), the height of the search window 32 is set in accordance with the number, so that a storage area 511 in the reference image 301 and a storage area 512 in the reference image 302 are stored in the MSRAM 13.

Figures 20, 21:
FIG. 20 is a diagram illustrating resizing of an image by the image production unit.
FIG. 21 is a diagram for illustrating distribution of the luminance data among the memory banks in the MSRAM.

FIG. 20 is a diagram illustrating resizing of an image by the image production unit 12. As illustrated in FIG. 20, the image production unit 12 reads four 8×2 packed words aligned in two columns by two rows in a pixel space from the LSRAM 11, and performs, for example, filtering or subsampling of pixels on these four 8×2 packed words, so as to produce one 8×2 packed word reduced to ¼. The produced 8×2 packed word is stored in a unit storage area of the MSRAM 13.

FIG. 21 is a diagram for illustrating distribution of the luminance data among the memory banks in the MSRAM 13. FIG. 21 illustrates 64 pieces of 8×2 packed words included in a pixel space of 32 columns×32 rows. The numerals in the figure indicate bank indexes allotted to the memory banks of the 0th bank 420 to the seventh bank 427. The address generation unit 43 sets the bank indexes of the packed word, based on x and y coordinates in a unit of a packed word in a pixel space. As illustrated in FIG. 21, luminance data pieces are distributed to the memory banks, so that arbitrary eight pieces of unit luminance data aligned in one column by eight rows are stored in different memory banks and arbitrary eight pieces of unit luminance data aligned in two columns by four rows are stored in different memory banks.

FIG. 22 is a diagram illustrating the luminance data in FIG. 21. The eight pieces of unit luminance data (1 column×8 rows) included in an area R11 can be read from or written to the MSRAM 13 simultaneously. The eight pieces of unit luminance data (2 columns×4 rows) included in an area R12 can be read from or written to the MSRAM 13 simultaneously.

The address generation unit 43 sets the bank address BA in the memory bank for storing the packed words, based on x and y coordinates in a unit of a packed word in a pixel space.

FIG. 23 is a diagram illustrating an example of setting the bank address BA in the MSRAM 13. FIG. 23 illustrates the same 64 pieces of 8×2 packed words as FIG. 21. The numerals in the figure indicate bank addresses BA. In this example, eight packed words aligned in one column by eight rows have a common bank address BA. For example, the eight packed words at the upper left have the bank address BA=0, and the adjacent eight packed words to the right have BA=1.

FIGS. 24 to 28 are diagrams for illustrating a rule for updating image data to be written from the image production unit 12 to the MSRAM 13. While motion search targeting a current macroblock is performed, image data in an area for processing a subsequent current macroblock is written from the image production unit 12 to the MSRAM 13.

Figure 24:
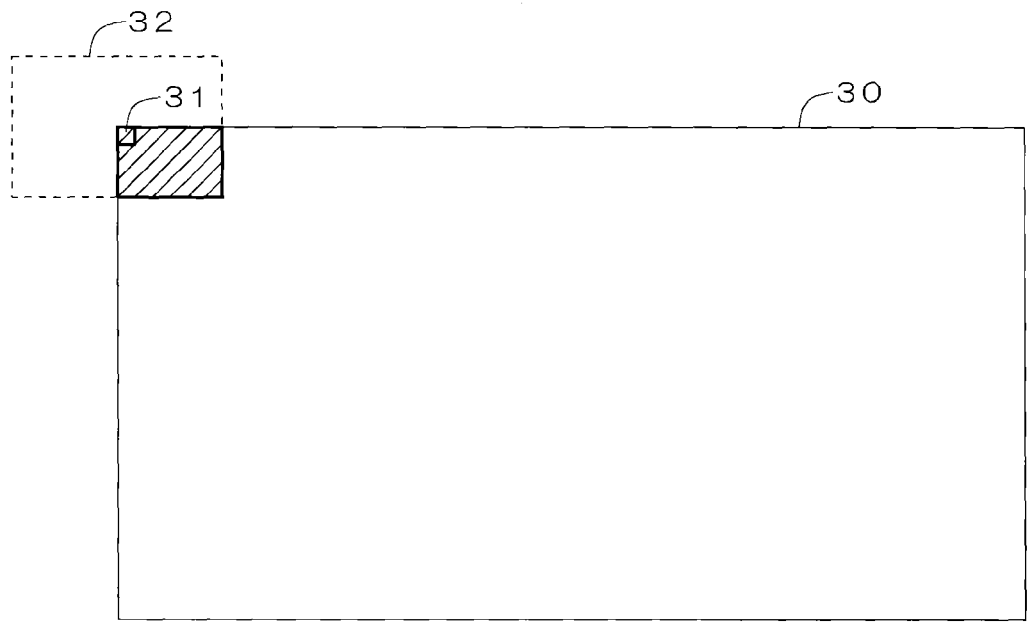
FIG. 24 is a diagram for illustrating a rule for updating image data to be written from the image production unit to the MSRAM.

Referring to FIG. 24, the current macroblock 31 is located at the top-left corner of the reference image 30 when processing starts. Here, the image data in a range where the search window 32 overlaps the reference image 30 (diagonally shaded area) is written from the image production unit 12 to the MSRAM 13.

Figure 25:
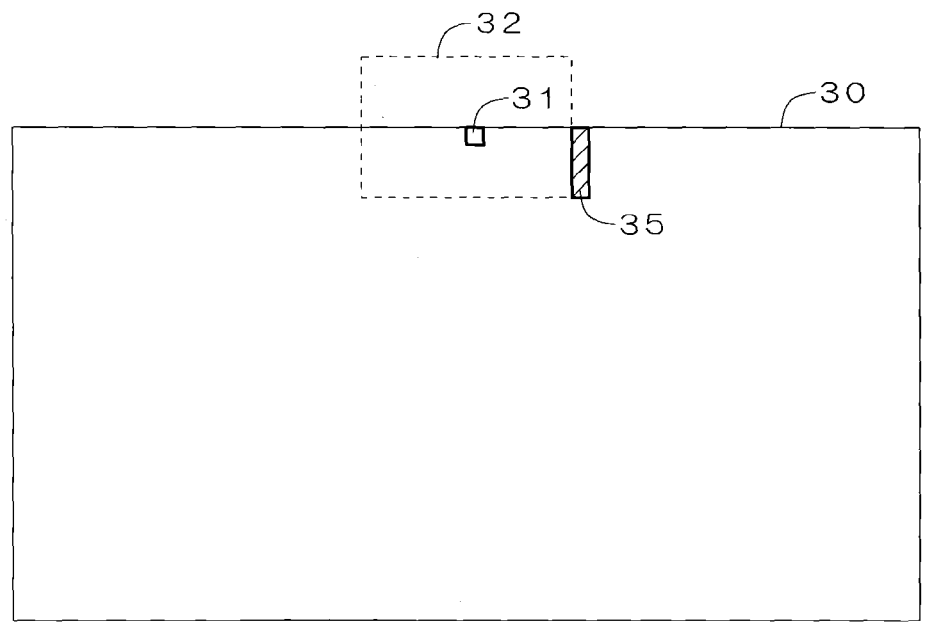
FIG. 25 is a diagram for illustrating a rule for updating image data to be written from the image production unit to the MSRAM.

Referring to FIG. 25, when the current macroblock 31 is on the upper side of the reference image 30, the image data of an area 34 in the reference image 30 and on the right side of the search window 32 is written from the image production unit 12 to the MSRAM 13.

Figure 26:
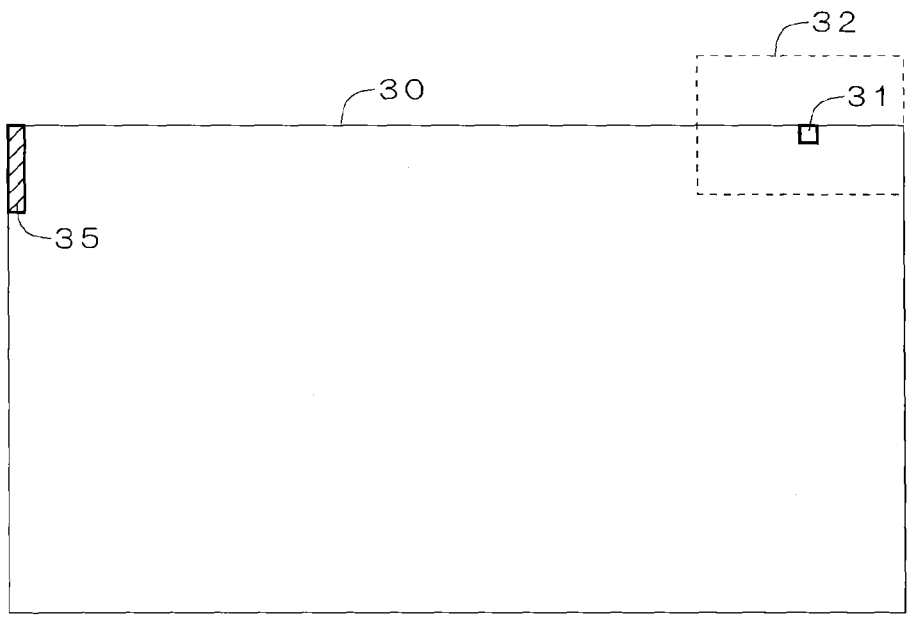
FIG. 26 is a diagram for illustrating a rule for updating image data to be written from the image production unit to the MSRAM.

Referring to FIG. 26, when the right side of the search window 32 is on the right side of the reference image 30, the image data of an area 34 located corresponding to the search window 32 and one macroblock line below its lower side and on the left side of the reference image 30 is written from the image production unit 12 to the MSRAM 13.

Figure 27:
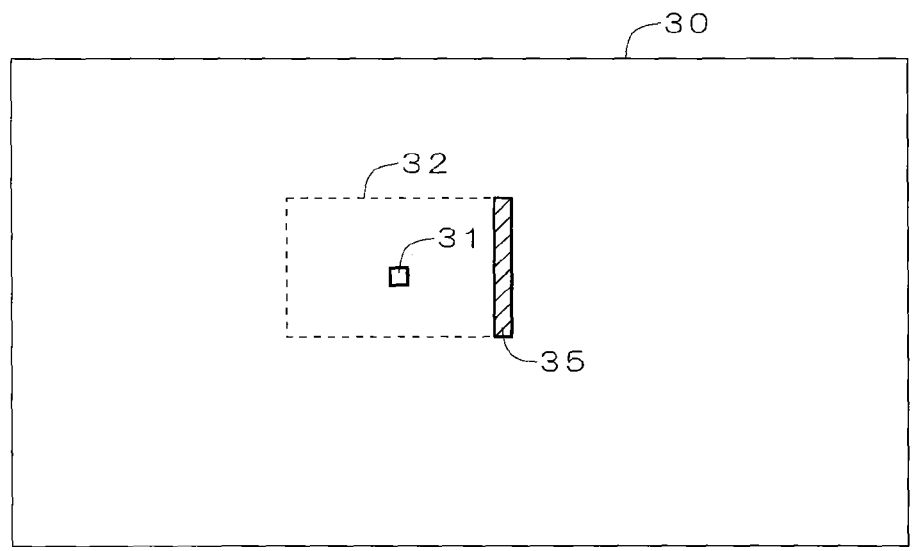
FIG. 27 is a diagram for illustrating a rule for updating image data to be written from the image production unit to the MSRAM.

Referring to FIG. 27, in a normal update when the current macroblock 31 is around the center of the reference image 30, the image data of an area 34 on the right side of the search window 32 is written from the image production unit 12 to the MSRAM 13.

Figure 28:
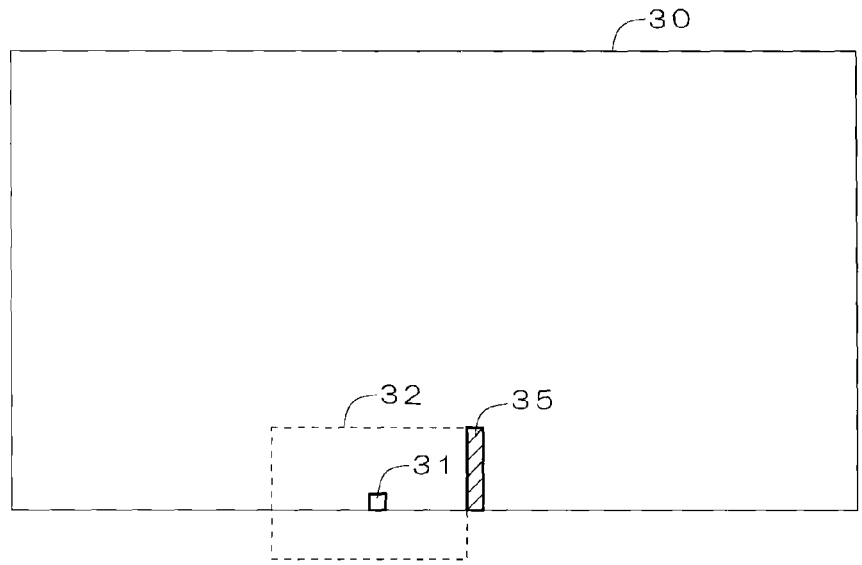
FIG. 28 is a diagram for illustrating a rule for updating image data to be written from the image production unit to the MSRAM.

Referring to FIG. 28, when the current macroblock 31 is on the lower side of the reference image 30, the image data of an area 34 in the reference image 30 and on the right side of the search window 32 is written from the image production unit 12 to the MSRAM 13.

Figure 29:
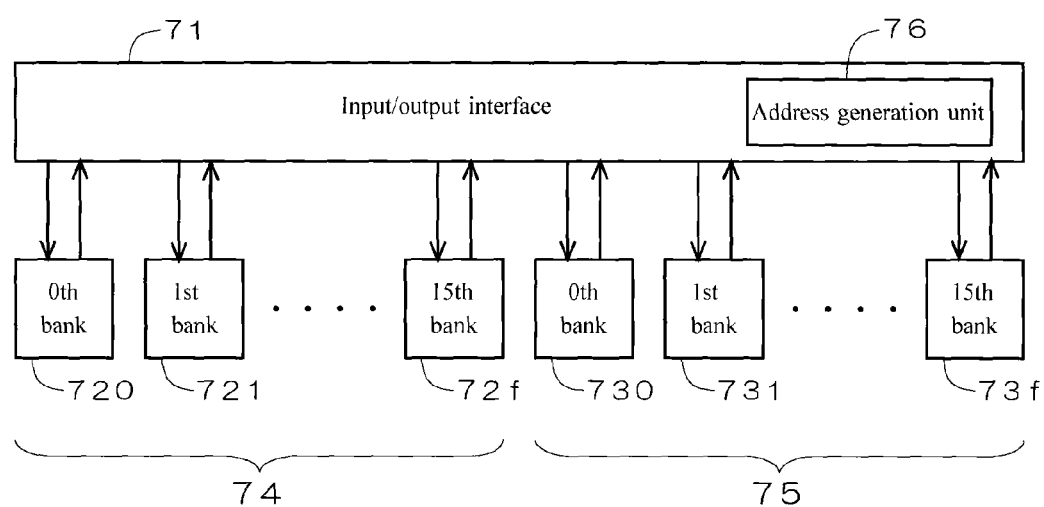
FIG. 29 is a diagram illustrating a configuration of the SSRAM.

FIG. 29 is a diagram illustrating a configuration of the SSRAM 17. The SSRAM 17 is split into multiple memory bank, being configured with 32 memory banks in total including 0th to fifteenth banks 720 to 72f belonging to a first set 74 and 0th to fifteenth banks 730 to 73f belonging to a second set 75 in this example. Each of the first set 74 and the second set 75 switches a write of an image from the transfer unit 16 and a read of an image to the search unit 18 on a time division basis. Simultaneous access to different memory banks is available, and the number of banks the memory is split into is set at such a number that these writes and reads on a time division basis are performed without delay.

Writes of image data to the 0th to fifteenth banks 720 to 72f belonging to the first set 74 and reads of image data from the 0th to fifteenth banks 730 to 73f belonging to the second set 75 can be performed simultaneously. Similarly, reads of image data from the 0th bank 720 to the fifteenth bank 72f belonging to the first set 74 and writes of image data to the 0th bank 730 to the fifteenth bank 73f belonging to the second set 75 can be performed simultaneously. While the search unit 18 is reading the reference image from the memory bank of the first set 74 to perform motion search on a first current macroblock, the reference image to be used in motion search on a subsequent second current macroblock is written from the transfer unit 16 to the memory bank of the second set 75. Then while the search unit 18 is reading the reference image from the memory bank of the second set 75 to perform motion search on the second current macroblock, the reference image to be used in motion search on a subsequent third current macroblock is written from the transfer unit 16 to the memory bank of the first set 74.

Each of the memory banks has a storage area for 32 words, among which the first 16 words are for storing image data for forward prediction and the latter 16 words are for storing image data for backward prediction. An input/output interface 71 including an address generation unit 76 is connected to the memory banks.

Figure 30:
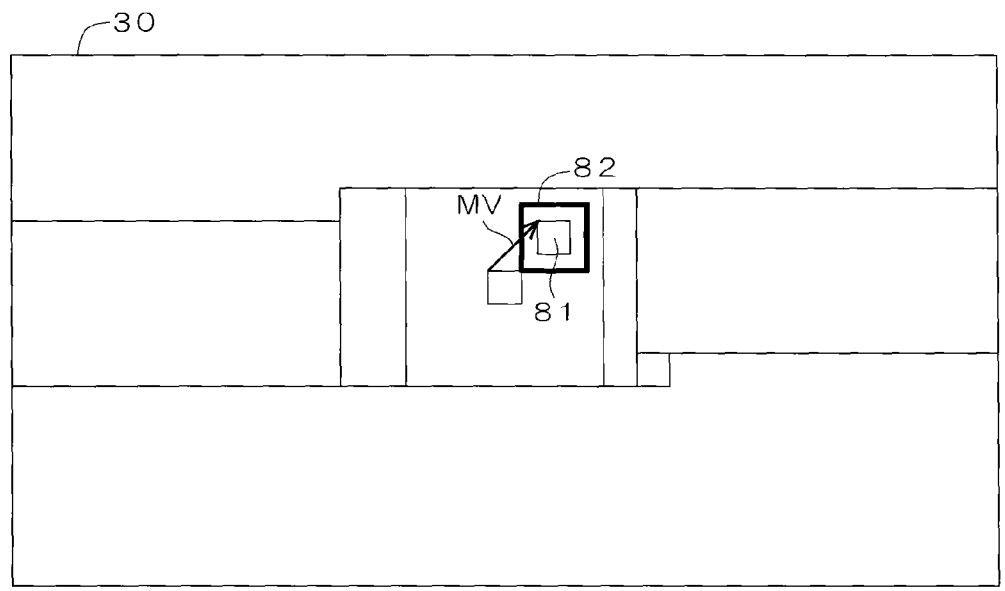
FIG. 30 is a diagram illustrating an example of an image to be stored in the SSRAM.

FIG. 30 is a diagram illustrating an example of an image to be stored in the SSRAM 17. The SSRAM 17 holds luminance data of a reference macroblock 81 and the surrounding storage area 82. The reference macroblock 81 is a macroblock indicated by a motion vector MV obtained as a result of integer accuracy pixel search by the search unit 15.

The search unit 15 performs motion search in macroblock part mode 1 with one block of 16 columns×16 rows, in macroblock part mode 2 with two blocks of 16 columns×8 rows, in macroblock part mode 3 with two blocks of 8 columns×16 rows, and in macroblock part mode 4 with four blocks of 4 columns×4 rows, and then outputs the motion vector in the mode having the highest similarity as a result of search. Thus search by the search unit 15 results in one storage area 82 with the motion vector in the macroblock part mode 1, two storage areas 82 with the motion vector in the macroblock part mode 2 or 3, and four storage areas 82 with the motion vector in the macroblock part mode 4.

The SSRAM 17 also holds, though not illustrated in FIG. 30, a reference images for a Skip/Direct vector and a reference image for a (0, 0) vector. The Skip/Direct vector is a general term for a motion vector in the Skip/Direct macroblock mode as defined in H.264 standard, and is generated based on information on blocks adjacent to a current macroblock. The (0, 0) vector is a motion vector of a macroblock in the same position as a current macroblock in a reference image.

Figure 31:
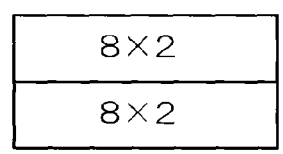
FIG. 31 is a diagram illustrating packed word conversion by the transfer unit.
Figure 31:
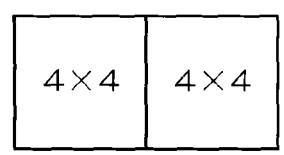

FIG. 31 is a diagram illustrating packed word conversion by the transfer unit 16. As illustrated in FIG. 31, in transferring pixel data from the LSRAM 11 to the SSRAM 17, the transfer unit 16 converts 8×2 packed words equivalent of luminance data of 8 columns×2 rows in a pixel space into a unit luminance data piece (hereinafter, "4×4 packed word") equivalent of luminance data of 4 columns×4 rows in a pixel space. More specifically, two pieces of 8×2 packed words aligned in one column by two rows in a pixel space are read from the LSRAM 11, and the boundary between the two packed words are changed to two pieces of 4×4 packed words aligned in two rows by 1 column in the pixel space.

The produced 4×4 packed words are stored in the unit storage area of the SSRAM 17.

FIG. 32 is a diagram for illustrating distribution of the luminance data among the memory banks in the SSRAM 17. FIG. 32 illustrates 256 pieces of 4×4 packed words included in a pixel space equivalent of 64 columns×64 rows. The numerals on the left side in the boxes indicate bank indexes, and the numerals on the right side indicate bank addresses BA.

An assembly of storage areas of 16 words of 16 memory banks are classified into a group G1 having a bank address BA of "0", "1", "2", "4", "5", "6", "8", "9", or "a", a group G2 having a bank address BA of "3", "7", "b", or "c", a group G3 having a bank address BA of "d", and a group G4 having a bank address BA of "e" or "f". The group G1 holds a reference image for decimal accuracy pixel search based on integer accuracy pixel search by the search unit 15. The group G2 holds a reference image for a Skip/Direct vector. The group G3 holds a reference image for a (0, 0) vector. The group G4 is an unused reserve area. The address generation unit 76 sets the bank indexes BI and bank addresses BA for storing the packed words, based on x and y coordinates in a unit of a packed word in a pixel space. As illustrated in FIG. 32, luminance data pieces are distributed to the memory bank, so that arbitrary 16 unit luminance data piece aligned in four columns by four rows are stored in different memory banks.

FIG. 33 is a diagram illustrating the luminance data in FIG. 32. Arbitrary 16 pieces of unit luminance data (4 columns×4 rows) included in the area R21 of the group G1 can be read from or written to the SSRAM 17 simultaneously. Similarly, arbitrary 16 pieces of unit luminance data included in the area R22 of the group G2 and 16 pieces of unit luminance data included in the area R23 of the group G3 can be read from or written to the SSRAM 17 simultaneously.

FIGS. 34 to 39 are diagrams illustrating a storage area of a reference image in the SSRAM 17.

FIG. 34 illustrates an example of a search result by the search unit 15 including a motion vector in the macroblock part mode 1. With such a result, producing an image of ¼ pixel accuracy from an image of 16 columns×16 rows with a 6-tap filter requires an integer accuracy image of 21 columns×21 rows. Since one word holds pixel data of 4 columns×4 rows, a storage area of 6 columns×6 rows is sufficient for obtaining an integer accuracy image of 21 columns×21 rows from an arbitrary coordinate position. For search in a range of ±1.0, a reference image is stored in a storage area of 7 columns×7 rows indicated by the thick line in the figure. In such search, the search unit 18 performs reads of pixel data in a unit of 13 columns×13 rows four times on the storage area of the reference image, so as to read the reference image from the SSRAM 17. Then in motion search on a block of 16 columns×16 rows, evaluation of the blocks of 16 columns×8 rows, 8 columns×16 rows, and 8 columns×8 rows in the block of 16 columns×16 rows is also performed for motion search in each of the four modes of the macroblock part modes 1, 2, 3, and 4 together.

FIG. 35 illustrates an example of a search result by the search unit 15 including a motion vector in the macroblock part mode 2. With such a result, producing an image of ¼ pixel accuracy from an image of 16 columns×8 rows with a 6-tap filter requires an integer accuracy image of 21 columns×13 rows. Since one word holds pixel data of 4 columns×4 rows, a storage area of 6 columns×4 rows is sufficient for obtaining an integer accuracy image of 16 columns×8 rows from an arbitrary coordinate position. For search in a range of ±1.0, a reference image is stored in two storage areas of 7 columns×5 rows as indicated by the thick line in the figure. In such search, the search unit 18 performs reads of pixel data in a unit of 13 columns×13 rows twice on each of the two storage areas of the reference image, so as to read the reference image from the SSRAM 17. Then in motion search on a block of 16 columns×8 rows, evaluation of the blocks of 8 columns×8 rows in the block of 16 columns×8 rows is also performed for motion search in each of the macroblock part modes 2 and 4 together.

FIG. 36 illustrates an example of a search result by the search unit 15 including a motion vector in the macroblock part mode 3. With such a result, producing an image of ¼ pixel accuracy from an image of 8 columns×16 rows with a 6-tap filter requires an integer accuracy image of 13 columns×21 rows. Since one word holds pixel data of 4 columns×4 rows, a storage area of 4 columns×6 rows is sufficient for obtaining an integer accuracy image of 8 columns×16 rows from an arbitrary coordinate position. For search in a range of ±1.0, a reference image is stored in two storage areas of 5 columns×7 rows indicated by the thick line in the figure. In such search, the search unit 18 performs read of pixel data in a unit of 13 columns×13 rows twice on the two storage areas of the reference image, so as to read the reference image from the SSRAM 17. Then in motion search on a block of 8 columns×16 rows, evaluation of the blocks of 8 columns×8 rows in the block of 8 columns×16 rows is also performed for motion search in each of the macroblock part modes 3 and 4.

FIG. 37 illustrates an example of a search result by the search unit 15 including a motion vector in the macroblock part mode 4. With such a result, producing an image of ¼ pixel accuracy from an image of 8 columns×8 rows with a 6-tap filter requires an integer accuracy image of 13 columns×13 rows. Since one word holds pixel data of 4 columns×4 rows, a storage area of 4 columns×4 rows is sufficient for obtaining an integer accuracy image of 8 columns×8 rows from an arbitrary coordinate position. For search in a range of ±1.0, a reference image is stored in four storage areas of 5 columns×5 rows indicated by the thick line in the figure. In such search, the search unit 18 performs a read of pixel data in a unit of 13 columns×13 rows once on the four storage areas of the reference image, so as to read the reference image from the SSRAM 17. Then motion search in the macroblock part mode 4 is performed on the blocks of 8 columns×8 rows.

FIG. 38 illustrates a storage area of a reference image for a Skip/Direct vector. Here, producing an image of ¼ pixel accuracy from an image of 16 columns×16 rows with a 6-tap filter requires an integer accuracy image of 21 columns×21 rows. Since one word holds pixel data of 4 columns×4 rows, a storage area of 6 columns×6 rows is sufficient for obtaining an integer accuracy image of 21 columns×21 rows from an arbitrary coordinate position. Thus a reference image is stored in a storage area of 6 columns×6 rows indicated by the thick line in the figure.

FIG. 39 illustrates a storage area of a reference image for a (0, 0) vector. Here, producing an image of ¼ pixel accuracy is not required, and thus an integer accuracy image of 16 columns×16 rows is sufficient for obtaining an image of 16 columns×16 rows. Selecting a pixel from an arbitrary coordinate position is also not required, and thus a reference image is stored in a storage area of 4 columns×4 rows indicated by the thick line in the figure.

As described above, according to the motion search unit 4 in the present embodiment, the image production unit 12 produces a reduced image for rough search based on an image read from the LSRAM 11. The search unit 14 also performs reduced pixel search based on a reduced image read from the MSRAM 13. The search unit 15 also performs integer accuracy pixel search based on an image read from the LSRAM 11. Here, the LSRAM 11 and the MSRAM 13 are both accessible with a higher speed than the frame memory 2. Thus in comparison with reads of an image from the frame memory 2 by the image production unit 12, the search unit 14, and the search unit 15, time required for reads is shortened, and thus high-speed motion search is achieved as a whole.

According to the motion search unit 4 in the present embodiment, the transfer unit 16 stores the image read from the LSRAM 11 in the SSRAM 17. The search unit 18 performs decimal accuracy pixel search based on the image read from the SSRAM 17. Here, the SSRAM 17 is accessible with a higher speed than the frame memory 2. Thus in comparison with reads of an image from the frame memory 2 by the transfer unit 16 and the search unit 18, time required for reads is shortened, and thus high-speed motion search is achieved as a whole.

According to the motion search unit 4 in the present embodiment, a unit storage area of the LSRAM 11 holds a unit luminance data piece equivalent of luminance data of 8 columns×2 rows in a pixel space, or a unit chrominance data piece equivalent of chrominance data of 8 columns×4 rows in a pixel space. Thus a unit luminance data piece of 8 columns×2 rows to be stored in a unit storage area of the MSRAM 13 and a unit luminance data piece of 4 columns×4 rows to be stored in a unit storage area of the SSRAM 17 can be produced easily based on the unit luminance data pieces stored in the unit storage areas of the LSRAM 11.

According to the motion search unit 4 in the present embodiment, eight pieces of unit luminance data aligned in two columns by four rows are stored in different memory banks in the LSRAM 11. Thus these eight pieces of unit luminance data can be written to and read from the LSRAM 11 simultaneously.

According to the motion search unit 4 in the present embodiment, eight pieces of unit luminance data aligned in one column by eight rows are stored in different memory banks in the LSRAM 11. Thus these eight pieces of unit luminance data can be written to and read from the LSRAM 11 simultaneously.

According to the motion search unit 4 in the present embodiment, eight pieces of unit chrominance data aligned in two columns by four rows are stored in different memory banks in the LSRAM 11. Thus these eight pieces of unit chrominance data can be written to and read from the LSRAM 11 simultaneously.

According to the motion search unit 4 in the present embodiment, four pieces of unit luminance data aligned in one row by four columns and two pieces of unit chrominance data aligned in one column by two rows are stored in different memory banks in the LSRAM 11. Thus these four pieces of unit luminance data and two pieces of unit chrominance data can be written to and read from the LSRAM 11 simultaneously.

According to the motion search unit 4 in the present embodiment, four pieces of unit luminance data aligned in two columns by two rows and two pieces of unit chrominance data aligned in two columns by one row are stored in different memory banks in the LSRAM 11. Thus these four pieces of unit luminance data and two pieces of unit chrominance data can be written to and read from the LSRAM 11 simultaneously.

According to the motion search unit 4 in the present embodiment, the address generation unit 23 sets a memory bank for storing each of the unit luminance data pieces and the unit chrominance data pieces among multiple memory banks of the LSRAM 11, based on positional coordinates of unit luminance data pieces and unit chrominance data pieces in a pixel space. Thus each of the unit luminance data pieces and the unit chrominance data pieces are stored in an appropriate memory bank.

According to the motion search unit 4 in the present embodiment, the address generation unit 23 sets an address in the memory bank for storing each of the unit luminance data pieces and the unit chrominance data pieces, based on the positional coordinates of the unit luminance data pieces and the unit chrominance data pieces in a pixel space. Thus the unit luminance data pieces and the unit chrominance data pieces are stored at an appropriate address in the memory bank.

According to the motion search unit 4 in the present embodiment, a read and a write of data from and to the LSRAM 11 are performed on a time division basis. Thus configuration of the LSRAM 11 with a single-port RAM is realized, achieving reduction in a circuit size.

According to the motion search unit 4 in the present embodiment, a vertical size of the search window 32 is set in a unit of a predetermined number of rows, so that the LSRAM 11 is enabled to hold one or multiple reference images. This realizes motion search not only with a single reference image but also with multiple reference images.

According to the motion search unit 4 in the present embodiment, while motion search targeting a current macroblock is performed, luminance and chrominance data in an area for processing a subsequent current macroblock is written to the LSRAM 11. Thus upon completion of motion search targeting a current macroblock, processing of a subsequent current macroblock is started without delay.

According to the motion search unit 4 in the present embodiment, the image production unit 12 produces one piece of unit luminance data of 8 columns×2 rows in a pixel space, based on four pieces of unit luminance data aligned in two columns by two rows in the LSRAM 11. This facilitates producing a reduced image to be produced by reducing an image stored in the LSRAM 11 to ¼.

According to the motion search unit 4 in the present embodiment, eight pieces of unit luminance data aligned in two columns by four rows are stored in different memory banks of the MSRAM 13. Thus these eight pieces of unit luminance data can be written to and read from the MSRAM 13 simultaneously.

According to the motion search unit 4 in the present embodiment, eight pieces of unit luminance data aligned in one column by eight rows are stored in different memory banks of the MSRAM 13. Thus these eight pieces of unit luminance data can be written to and read from the MSRAM 13 simultaneously.

According to the motion search unit 4 in the present embodiment, the address generation unit 43 sets a memory bank for storing each of the unit luminance data pieces among the multiple memory bank of the MSRAM 13, based on positional coordinates of unit luminance data pieces in a pixel space. Thus each of the unit luminance data pieces is stored in an appropriate memory bank.

According to the motion search unit 4 in the present embodiment, the address generation unit 43 sets an address in the memory bank for storing each of the unit luminance data pieces, based on the positional coordinates of the unit luminance data pieces in a pixel space. Thus the unit luminance data pieces are stored at an appropriate address in the memory bank.

According to the motion search unit 4 in the present embodiment, a read and a write of data from and to the MSRAM 13 are performed on a time division basis. Thus configuration of the MSRAM 13 with a single-port RAM is realized, achieving reduction in a circuit size.

According to the motion search unit 4 in the present embodiment, a vertical size of the search window 32 is set in a unit of a predetermined of rows, so that the MSRAM 13 is enabled to hold one or multiple reference images. This realizes motion search not only with a single reference image but also with multiple reference image.

According to the motion search unit 4 in the present embodiment, while motion search targeting a current macroblock is performed, luminance data in an area for processing a subsequent current macroblock is written to the MSRAM 13. Thus upon completion of motion search targeting a current macroblock, processing of a subsequent current macroblock is started without delay.

According to the motion search unit 4 in the present embodiment, the transfer unit 16 generates two pieces of unit luminance data of 4 columns×4 rows in a pixel space, based on two pieces of unit luminance data of 8 columns×2 rows aligned in one column by two rows in the LSRAM 11. This facilitates conversion from a unit luminance data piece of 8 columns×2 rows to a unit luminance data piece of 4 columns×4 rows.

According to the motion search unit 4 in the present embodiment, 16 pieces of unit luminance data aligned in four columns by four rows are stored in different memory banks of the SSRAM 17. Thus these 16 pieces of unit luminance data can be written to and read from the SSRAM 17 simultaneously.

According to the motion search unit 4 in the present embodiment, the address generation unit 76 sets a memory bank for storing each of the unit luminance data pieces among multiple memory banks of the SSRAM 17, based on positional coordinates of unit luminance data pieces in a pixel space. Thus each of the unit luminance data pieces is stored in an appropriate memory bank.

According to the motion search unit 4 in the present embodiment, the address generation unit 76 sets an address in the memory bank for storing each of the unit luminance data pieces, based on the positional coordinates of the unit luminance data pieces in a pixel space. Thus the unit luminance data pieces are stored at an appropriate address in the memory bank.

According to the motion search unit 4 in the present embodiment, a read and a write of data from and to each of the first set 74 and the second set 75 of the SSRAM 17 are performed on a time division basis. Thus configuration of the SSRAM 17 with a single-port RAM is realized, achieving reduction in a circuit size.

According to the motion search unit 4 in the present embodiment, while a read of data from one of the first set 74 and the second set 75 for motion search targeting a current macroblock is performed, data for motion search targeting a subsequent current macroblock is written to the other one of the first set 74 and the second set 75. Thus upon completion of motion search targeting a current macroblock, processing of a subsequent current macroblock is started without delay.

According to the motion search unit 4 in the present embodiment, the SSRAM 17 holds a predetermined number of unit luminance data pieces, in accordance with a macroblock part mode included in a search result by the search unit 15. Thus motion search by the search unit 18 is appropriately performed in accordance with a macroblock part mode.

According to the motion search unit 4 in the present embodiment, the SSRAM 17 further holds a reference image for a Skip/Direct vector and a reference image for a (0, 0) vector. This increases accuracy of motion search by the search unit 18.

While the invention has been described in detail, the foregoing description is in all aspects illustrative and not restrictive. It is therefore understood that numerous modifications and variations can be devised without departing from the scope.

EXPLANATION OF REFERENCE NUMERALS 1 encoder
2 frame memory
4 motion search unit
11 LSRAM
12 image production unit
13 MSRAM
14, 15, 18 search unit
16 transfer unit
17 SSRAM
23, 43, 76 address generation unit
74 first set
75 second set

The invention claimed is:

1. An image processor that performs motion searches by referring to a first image stored in an external memory, the image processor comprising:
circuitry configured to:
hold a second image in a first internal memory accessible with a higher speed than the external memory, the second image being in a predetermined range of the first image and including luminance data and chrominance data, wherein the first internal memory holds, in a unit storage area, a unit luminance data piece equivalent of luminance data of 8 columns×2 rows in a pixel space or a unit chrominance data piece equivalent of chrominance data of 8 columns×4 rows a pixel space, and includes a plurality of memory banks, the memory banks being configured to hold eight pieces of unit luminance data aligned in two columns by four rows separately, and hold eight pieces of unit luminance data aligned in one column by eight rows separately;
read an image in a predetermined range of the second image from the first internal memory and produce a third image for rough search based on the read image;
hold the third image in a second internal memory accessible with a higher speed than the external memory;
read the third image from the second internal memory and perform a first motion search based on the third image; and
read a fourth image in a predetermined range of the second image from the first internal memory based on the first motion search and perform a second motion search that is more detailed than the first motion search based on the fourth image, wherein results of the motion searches are used to obtain motion vectors for a video coding with a reduced latency involved in obtaining the motion vectors.

2. The image processor according to claim 1, further comprising:
a third internal memory accessible with a higher speed than the external memory, wherein the circuitry is further configured to read a fifth image of a predetermined range in the second image from the first internal memory based on the second motion search and store the fifth image in the third internal memory; and read the fifth image from the third internal memory and perform a third motion search that is more detailed than the second motion search based on the fifth image.

3. The image processor according to claim 1, wherein
the first internal memory includes a plurality of memory banks,
the memory banks being configured to hold eight pieces of unit chrominance data aligned in two columns by four rows separately.

4. The image processor according to claim 1, wherein
the first internal memory includes a plurality of memory banks,
the memory banks being configured to hold four pieces of unit luminance data aligned in one column by four rows and two pieces of unit chrominance data aligned in one column by two rows separately.

5. The image processor according to claim 1, wherein
the first internal memory includes a plurality of memory banks,
the memory banks being configured to hold four pieces of unit luminance data aligned in two columns by two rows and two pieces of unit chrominance data aligned in two columns by one row separately.

6. The image processor according to claim 1, wherein the first internal memory includes a plurality of memory banks, and the circuitry is further configured to set a memory bank for storing each of the unit luminance and chrominance data pieces among the memory banks, based on a positional coordinate of the unit luminance and chrominance data pieces in a pixel space.

7. The image processor according to claim 6, wherein
the circuitry is further configured to set an address in the memory bank for storing each of the unit luminance and chrominance data pieces, based on the positional coordinate of the unit luminance and chrominance data pieces in the pixel space.

8. The image processor according to claim 1, wherein
a read and a write of data from and to the first internal memory are performed on a time division basis.

9. The image processor according to claim 1, wherein
a vertical size of the second image is set in a unit of a predetermined number of rows, so that the first internal memory is enabled to hold one or a plurality of second images.

10. The image processor according to claim 1, wherein
while motion search targeting a current macroblock is performed, luminance and chrominance data in an area for processing a subsequent current macroblock is written to the first internal memory.

11. The image processor according claim 1, wherein
the circuitry is further configured to produce one piece of unit luminance data of 8 columns×2 rows in a pixel space, based on four pieces of unit luminance data aligned in two columns by two rows in the first internal memory, and stores the unit luminance data piece in a unit storage area of the second internal memory.

12. The image processor according to claim 11, wherein
the second internal memory includes a plurality of memory banks,
the memory banks being configured to hold eight pieces of unit luminance data aligned in two columns by four rows separately.

13. The image processor according to claim 11, wherein the second internal memory includes a plurality of memory banks,
the memory banks being configured to hold eight pieces of unit luminance data aligned in one column by eight rows separately.

14. The image processor according to claim 11, wherein the second internal memory includes a plurality of memory banks, the circuitry is further configured to set a memory bank for storing each unit luminance data piece among the memory banks, based on a positional coordinate of the unit luminance data piece in a pixel space.

15. The image processor according to claim 14, wherein the circuitry is further configured to set an address in the memory bank for storing each unit luminance data piece, based on the positional coordinate of the unit luminance data piece in the pixel space.

16. The image processor according to claim 11, wherein a read and a write of data from and to the second internal memory are performed on a time division basis.

17. The image processor according to claim 11, wherein a vertical size of the third image is set in a unit of a predetermined number of rows, so that the second internal memory is enabled to hold one or a plurality of third images.

18. The image processor according to claim j, wherein while motion search targeting a current macroblock is performed, luminance data in an area for processing a subsequent current macroblock is written to the second internal memory.

19. The image processor according to claim 1, wherein the circuitry is further configured to generate two pieces of unit luminance data of 4 columns×4 rows in a pixel space, based on two pieces of unit luminance data aligned in one column by two rows in the first internal memory, and stores the unit luminance data pieces in a unit storage area of the third internal memory.

20. The image processor according to claim 19, wherein the third internal memory includes a plurality of memory banks,
the memory banks being configured to hold 16 pieces of unit luminance data aligned in four columns by four rows separately.

21. The image processor according to claim 19, wherein the third internal memory includes a plurality of memory banks, and the circuitry is further configured to set a memory bank for storing each unit luminance data piece among the memory banks, based on a positional coordinate of the unit luminance data piece in a pixel space.

22. The image processor according to claim 21, wherein the circuitry is further configured to set an address in the memory bank for storing each unit luminance data piece, based on the positional coordinate of the unit luminance data piece in the pixel space.

23. The image processor according to claim 20, wherein the plurality of memory banks of the third internal memory includes a plurality of memory banks belonging to a first set and a plurality of memory banks belonging to a second set, and
a read and a write of data from and to each of the first and second sets are performed on a time division basis.

24. The image processor according to claim 23, wherein while a read of data from one of the first and second sets for motion search targeting a current macroblock is performed, data for motion search targeting a subsequent current macroblock is written to the other one of the first and second sets.

25. The image processor according to claim 19, wherein the third internal memory holds a predetermined number of unit luminance data pieces in accordance with a macroblock part mode included in a result of the second motion search.

26. The image processor according to claim 19, wherein the third internal memory further holds a reference image for a Skip/Direct vector and a reference image for a (0, 0) vector, based on a position of a current macroblock in a pixel space.

* * * * *